United States Patent
Gorodissky et al.

(10) Patent No.: US 10,257,220 B2
(45) Date of Patent: *Apr. 9, 2019

(54) VERIFYING SUCCESS OF COMPROMISING A NETWORK NODE DURING PENETRATION TESTING OF A NETWORKED SYSTEM

(71) Applicant: XM Ltd., Hertzelia (IL)

(72) Inventors: Boaz Gorodissky, Hod-Hasharon (IL); Adi Ashkenazy, Tel Aviv (IL); Ronen Segal, Hertzelia (IL)

(73) Assignee: XM Cyber Ltd., Hertsliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/983,309

(22) Filed: May 18, 2018

(65) Prior Publication Data
US 2018/0270268 A1  Sep. 20, 2018

Related U.S. Application Data

(63) Continuation of application No. PCT/IB2018/053298, filed on May 11, 2018, which is
(Continued)

(51) Int. Cl.
| | |
|---|---|
| *H04L 29/06* | (2006.01) |
| *H04L 12/26* | (2006.01) |
| *H04L 12/24* | (2006.01) |

(52) U.S. Cl.
CPC ........ *H04L 63/1433* (2013.01); *H04L 41/048* (2013.01); *H04L 43/50* (2013.01); *H04L 63/30* (2013.01)

(58) Field of Classification Search
CPC ..... H04L 63/1433; H04L 63/30; H04L 63/20; H04L 41/048; H04L 43/50; G06F 21/577;
(Continued)

(56) References Cited

U.S. PATENT DOCUMENTS

| | | |
|---|---|---|
| 6,918,038 B1 | 7/2005 | Smith et al. |
| 6,952,779 B1 | 10/2005 | Cohen et al. |

(Continued)

FOREIGN PATENT DOCUMENTS

| | | |
|---|---|---|
| CN | 103200230 A | 7/2013 |
| CN | 103916384 A | 7/2014 |

(Continued)

OTHER PUBLICATIONS

CN103200230 Machine Translation (by EPO and Google)—published Jul. 10, 2013; Li Qianmu.
(Continued)

*Primary Examiner* — Brian F Shaw
(74) *Attorney, Agent, or Firm* — Marc Van Dyke; Fourth Dimension IP

(57) ABSTRACT

A method of carrying out a penetration testing campaign of a networked system by a penetration testing system comprising (A) a penetration testing software module installed on a remote computing device and (B) a reconnaissance agent software module (RASM) installed on at least some network nodes of the networked system. In embodiments, at least the following is performed at the remote computing device: a target network node of the networked system on which the RASM is installed is selected; based on the target network node, a potential vulnerability that may compromise the target network node is selected; internal data of the target network node is received; and a validation step is performed. The validation is (i) carried out in a manner which does not expose the target network node to a risk of being compromised and (ii) is based on the received internal data of the target network node.

18 Claims, 12 Drawing Sheets

Related U.S. Application Data a continuation-in-part of application No. 15/911,168, filed on Mar. 4, 2018, now Pat. No. 10,038,711, which is a continuation of application No. 15/874,429, filed on Jan. 18, 2018, application No. 15/983,309, which is a continuation-in-part of application No. 15/911,168, and application No. PCT/IB2018/053298.

(60) Provisional application No. 62/451,850, filed on Jan. 30, 2017, provisional application No. 62/510,794, filed on May 25, 2017.

(58) Field of Classification Search
CPC ... G06F 2221/033; G06F 2221/034034; G06F 9/451
See application file for complete search history.

(56) References Cited

U.S. PATENT DOCUMENTS

| | | | |
|---|---|---|---|
| 7,013,395 | B1 | 3/2006 | Swiler et al. |
| 7,757,293 | B2 | 7/2010 | Caceres et al. |
| 8,001,589 | B2 | 8/2011 | Ormazabal et al. |
| 8,112,016 | B2 | 2/2012 | Matsumoto et al. |
| 8,127,359 | B2 | 2/2012 | Kelekar |
| 8,356,353 | B2 | 1/2013 | Futoransky et al. |
| 8,365,289 | B2 | 1/2013 | Russ et al. |
| 8,490,193 | B2 | 7/2013 | Sarraute Yamada et al. |
| 8,650,651 | B2 | 2/2014 | Podjarny et al. |
| 8,813,235 | B2 | 8/2014 | Sidagni |
| 9,076,013 | B1 | 7/2015 | Bailey, Jr. et al. |
| 9,183,397 | B2 | 11/2015 | Futoransky et al. |
| 9,224,117 | B2 | 12/2015 | Chapman |
| 9,270,696 | B2 | 2/2016 | Fritzson et al. |
| 9,276,952 | B2 | 3/2016 | Simpson et al. |
| 9,292,695 | B1 | 3/2016 | Bassett |
| 9,350,753 | B2 | 5/2016 | Kaplan et al. |
| 9,473,522 | B1 | 10/2016 | Kotler et al. |
| 9,558,355 | B2 | 1/2017 | Madou et al. |
| 10,038,711 | B1 | 7/2018 | Gorodissky et al. |
| 2005/0086502 | A1 | 4/2005 | Rayes et al. |
| 2007/0204347 | A1 | 8/2007 | Caceres et al. |
| 2009/0172813 | A1 | 7/2009 | Aaron |
| 2012/0174228 | A1 | 7/2012 | Giakouminakis et al. |
| 2013/0031635 | A1 | 1/2013 | Lotem et al. |
| 2014/0173739 | A1 | 6/2014 | Ahuja et al. |
| 2016/0044057 | A1* | 2/2016 | Chenette ............. H04L 63/1433 726/1 |
| 2016/0248800 | A1 | 8/2016 | Ng et al. |
| 2016/0275289 | A1 | 9/2016 | Sethumadhavan et al. |
| 2016/0342796 | A1 | 11/2016 | Kaplan et al. |
| 2016/0352771 | A1 | 12/2016 | Sivan et al. |
| 2017/0098086 | A1 | 4/2017 | Hoernecke et al. |
| 2017/0116421 | A1 | 4/2017 | M C et al. |
| 2018/0219900 | A1 | 8/2018 | Gorodissky et al. |
| 2018/0219901 | A1 | 8/2018 | Gorodissky et al. |
| 2018/0219904 | A1 | 8/2018 | Gorodissky et al. |
| 2018/0219905 | A1 | 8/2018 | Gorodissky et al. |
| 2018/0219909 | A1 | 8/2018 | Gorodissky et al. |

FOREIGN PATENT DOCUMENTS

| | | |
|---|---|---|
| CN | 104009881 A | 8/2014 |
| EP | 1559008 A1 | 8/2005 |
| WO | WO0038036 A2 | 6/2000 |
| WO | WO2010069587 A1 | 6/2010 |
| WO | WO2013087982 A1 | 6/2013 |
| WO | WO2015111039 A1 | 7/2015 |
| WO | WO2016164844 A1 | 10/2016 |

OTHER PUBLICATIONS

CN103916384 Machine Translation (by EPO and Google)—published Jul. 9, 2014; Zhong Li.
CN104009881 Machine Translation (by EPO and Google)—published Aug. 27, 2014; Wang Tian.

* cited by examiner

Selecting, by the remote computing device penetration testing software module, a target network node of the multiple network nodes to be the next network node for which the penetration test should check whether it can be compromised.

Selecting, by the remote computing device penetration testing software module, a potential vulnerability that may compromise the target network node.

Validating, by the remote computing device penetration testing software module, that the potential vulnerability can be used for successfully compromising the target network node, the validating achieved without compromising the target network node, the validating comprising:
1. receiving data from the reconnaissance agent software module installed on the target network node, the received data including internal data of the target network node;
2. based on the internal data of the target network node, evaluating whether the target network node could be successfully compromised using the potential vulnerability.

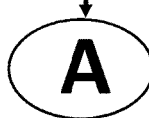

VERIFYING SUCCESS OF COMPROMISING A NETWORK NODE DURING PENETRATION TESTING OF A NETWORKED SYSTEM

CROSS-REFERENCE TO RELATED APPLICATIONS

This patent application claims the benefit of U.S. Provisional Patent Application No. 62/510,794 filed on May 25, 2017, which is incorporated herein by reference in its entirety. This patent application is a continuation in part of U.S. patent application Ser. No. 15/911,168 filed on Mar. 4, 2018 which is incorporated herein by reference in its entirety. This application is a continuation in part of U.S. patent application Ser. No. 15/874,429 filed on Jan. 18, 2018 which is incorporated herein by reference in its entirety. U.S. patent application Ser. No. 15/874,429 claims the benefit of U.S. Patent Application 62/451,850 filed on Jan. 30, 2017, which is incorporated herein by reference in its entirety. This applicant is a continuation of PCT/IB2018/053298 filed on May 11, 2018, which is incorporated herein by reference in its entirety.

BACKGROUND

A Discussion of FIGS. 1A-1B, 2-3

There is currently a proliferation of organizational networked computing systems. Every type of organization, be it a commercial company, a university, a bank, a government agency or a hospital, heavily relies on one or more networks interconnecting multiple computing nodes. Failures of the networked computing system of an organization or even of only a portion of it might cause a significant damage, up to completely shutting down all operations. Additionally, all data of the organization exists somewhere on its networked computing system, including all confidential data comprising its "crown jewels" such as prices, details of customers, purchase orders, employees' salaries, technical formulas, etc. Loss of such data or leaks of such data to outside unauthorized entities might be disastrous for the organization.

As almost all organizational networks are connected to the Internet at least through one computing node, they are subject to attacks by computer hackers or by hostile adversaries. Quite often the newspapers are reporting incidents in which websites crashed, sensitive data was stolen or service to customers was denied, where the failures were the results of hostile penetration into an organization's networked computing system.

As a result, many organizations invest a lot of efforts and costs in preventive means designed to protect their computing networks against potential threats. There are many defensive products offered in the market claiming to provide protection against one or more known modes of attack, and many organizations arm themselves to the teeth with multiple products of this kind.

However, it is difficult to tell how effective such products really are in achieving their stated goals of blocking hostile attacks, and consequently most CISO's (Computer Information Security Officers) will admit (maybe only off the record), that they don't really know how well they can withstand an attack from a given adversary. The only way to really know how strong and secure a system is, is by trying to attack it as a real adversary would. This is known as red-teaming or penetration testing (pen testing, in short), and is a very common approach that is even required by regulation in some developed countries.

Penetration testing requires highly talented people to man the red team. Those people should be familiar with each and every publicly known vulnerability and attacking method and should also have a very good familiarity with networking techniques and multiple operating systems implementations. Such people are hard to find and therefore many organizations give up establishing their own red teams and resort to hiring external expert consultants for carrying out that role (or completely give up penetration testing). But external consultants are expensive and therefore are typically called in only for brief periods separated by long intervals in which no such testing is done. This makes the penetration testing ineffective as vulnerabilities caused by new attacks that appear almost daily are discovered only months after becoming serious threats to the organization.

Additionally, even rich organizations that can afford hiring talented experts as in-house red teams do not achieve good protection. Testing for vulnerabilities of a large network containing many types of computers, operating systems, network routers and other devices is both a very complex and a very tedious process. The process is prone to human errors of missing testing for certain threats or mis-interpreting the damages of certain attacks. Also, because a manual process of full testing against all threats is quite long, the organization might again end with a too long discovery period after a new threat appears.

Because of the above difficulties several vendors are proposing automated penetration testing systems. Such systems automatically discover and report vulnerabilities of a networked system, potential damages that might be caused to the networked system, and potential trajectories of attack that may be employed by an attacker.

A penetration testing process involves at least the following main functions: (i) a reconnaissance function, (ii) an attack function, and (ii) a reporting function. The process may also include additional functions, for example a cleanup function that restores the tested networked system to its original state as it was before the test. In an automated penetration testing system, at least one of the above three functions is at least partially automated, and typically two or three of them are at least partially automated.

A reconnaissance function is the function within a penetration testing system that handles the collection of data about the tested networked system. The collected data may include internal data of networks nodes, data about network traffic within the tested networked system, business intelligence data of the organization owning the tested networked system, etc. The functionality of a prior art reconnaissance function can be implemented, for example, by software executing in a server that is not one of the network nodes of the tested networked system, where the server probes the tested networked system for the purpose of collecting data about it.

An attack function is the function within a penetration testing system that handles the determination of whether security vulnerabilities exist in the tested networked system based on data collected by the reconnaissance function. The functionality of a prior art attack function can be implemented, for example, by software executing in a server that is not one of the nodes of the tested networked system, where the server attempts to attack the tested networked system for the purpose of verifying that it can be compromised.

A reporting function is the function within a penetration testing system that handles the reporting of results of the penetration testing system. The functionality of a prior art reporting function may be implemented, for example, by software executing in the same server that executes the functionality of the attack function, where the server reports the findings of the attack function to an administrator or a CISO of the tested networked system.

FIG. 1A (PRIOR ART) is a block diagram of code modules of a typical penetration testing system. FIG. 1B (PRIOR ART) is a related flow-chart.

In FIG. 1A, code for the reconnaissance function, for the attack function, and for the reporting function are respectively labelled as 20, 30 and 40, and are each schematically illustrated as part of a penetration testing system code module (PTSCM) labelled as 10. The term 'code' is intended broadly and may include any combination of computer-executable code and computer-readable data which when read affects the output of execution of the code. The computer-executable code may be provided as any combination of human-readable code (e.g. in a scripting language such as Python), machine language code, assembler code and byte code, or in any form known in the art. Furthermore, the executable code may include any stored data (e.g. structured data) such as configuration files, XML files, and data residing in any type of database (e.g. a relational database, an object-database, etc.).

In one example and as shown in FIG. 1B, the reconnaissance function (performed in step S21 by execution of reconnaissance function code 20), the attack function (performed in step S31 by execution of attack function code 30) and the reporting function (performed in step S41 by execution of reporting function code 40) are executed in strictly sequential order so that first the reconnaissance function is performed by executing code 20 thereof, then the attack function is performed by executing code 30 thereof, and finally the reporting function is performed 40 by executing code thereof. However, the skilled artisan will appreciate that this order is just one example, and is not a requirement. For example, the attack and the reporting functions may be performed in parallel or in an interleaved way, with the reporting function reporting first results obtained by the attack function, while the attack function is working on additional results. Similarly, the reconnaissance and the attack functions may operate in parallel or in an interleaved way, with the attack function detecting a vulnerability based on first data collected by the reconnaissance function, while the reconnaissance function is working on collecting additional data.

FIG. 1A also illustrates code of an optional cleanup function which is labeled as 50. Also illustrated in FIG. 1B is step S51 of performing a cleanup function—e.g. by executing cleanup function code 50 of FIG. 1A.

"A campaign of penetration testing" is a specific run of a specific test of a specific networked system by the penetration testing system.

A penetration-testing-campaign module may comprise at least part of reconnaissance function code 20, attack function code 30, reporting function code 40 and optionally cleanup function code 50—for example, in combination with suitable hardware (e.g. one or more computing device 110 and one or more processor(s) 120 thereof) for executing the code.

FIG. 2 illustrates a prior art computing device 110 which may have any form-factor including but not limited to a laptop, a desktop, a mobile phone, a server, a tablet, or any other form factor. The computing device 110 in FIG. 2 includes (i) computer memory 160 which may store code 180; (ii) one or more processors 120 (e.g. central-processing-unit (CPU)) for executing code 180; and (iii) a network interface 150 (e.g. a network card, or a wireless modem).

Memory 160 may include any combination of volatile (e.g. RAM) and non-volatile (e.g. ROM, flash, disk-drive) memory.

Code 180 may include operating-system code—e.g. Windows®, Linux®, Android®, Mac-OS® or any other code.

In one example, a penetration testing system is the combination of (i) code 10 (e.g. including reconnaissance function code 20, attack function code 30, reporting function code 40, and optionally cleanup function code 50); and (ii) one or more computing devices 110 which execute the code 10. For example, a first computing device may execute a first portion of code 10 and a second computing device (e.g. in networked communication with the first computing device) may execute a second portion of code 10.

FIG. 3 illustrates one example of a networked system 200 that may be subjected to penetration testing. The networked system comprises a plurality of nodes—in the example of FIG. 3, 16 nodes are illustrated, each labeled by the letter "N" followed by an integer. Also illustrated in FIG. 3 are two external computing devices 254, 252 that reside outside the networked system 200. Computing device 254 resides 'in the cloud' relative to the networked system 200, while computing device 252 is in communication with the networked system 200 via a local-area network (LAN).

Both of nodes 254 and 252 are "networked system external"—i.e. outside of networked system 200. The term 'networked system external' is abbreviated as "NS-external". In the present document, a network node may be referred to simply as 'node'—'network node' and 'node' are interchangeable. Each network node may be a different computing device 110 illustrated in FIG. 2.

A Discussion of Types of Penetration Testing Systems

Some prior art penetration testing systems can be characterized as doing an "actual attack penetration testing", while other prior art penetration testing systems can be characterized as doing a "simulated penetration testing".

A prior art actual attack penetration testing system does its penetration testing by accessing and attempting to attack the tested networked system. Such a system actually accesses the tested networked system during the test and is not limiting itself to simulation. This includes (i) collecting data by the reconnaissance function about the tested networked system and its components by actively probing it. The probing is done by sending queries or other messages to one or more network nodes of the tested networked system, and then deducing information about the tested networked system from the received responses or from network traffic triggered by the queries or the messages. The reconnaissance function is fully implemented by software executing outside the tested networked system or by software executing in one or more network nodes of the tested networked system that analyze network traffic and network packets of the tested networked system, and (ii) verifying that the tested networked system can be compromised by actively attempting to compromise it and checking if it was indeed compromised. This implies that a side-effect of executing an actual attack penetration test might be actually compromising the tested networked system. Typically, prior art actual attack penetration testing systems include a function of cleanup and recovery at the end of the test, in which any compromising operation that was done during the test is undone. A prior art simulated penetration testing system does its penetration testing by avoiding disturbance to the tested networked system and specifically by avoiding any risk of compromising it. This implies, among other things, that whenever there is a need to verify that the tested networked system can be compromised by an operation or a sequence of operations, the verification is done by simulating the results of that operation or sequence of operations or by otherwise evaluating them, without taking the risk of actually compromising the tested networked system. Some prior art simulated penetration testing systems implement the simulation by duplicating all or parts of the hardware of the tested networked system. Then when there is a need for verifying that an operation or a sequence of operations compromises the tested networked system, this is done by actually attacking the duplicated system without risking the tested system. While this implementation achieves the goal of avoiding the risk of not compromising the tested networked system, it is highly expensive and also difficult to accurately implement, and therefore rarely used.

Unpublished U.S. patent application Ser. No. 15/911,168 discloses penetration testing systems that employ a type of reconnaissance agent penetration testing. Such penetration testing systems are characterized by using a reconnaissance agent software module installed on some network nodes of the tested networked system, where the instances of the reconnaissance agent take part in implementing the reconnaissance function. With regard to verifying that the tested networked system can be compromised by an operation or a sequence of operations, reconnaissance agent penetration testing is similar to simulated penetration testing in not risking actual compromising of the tested networked system. For more details see the Definitions Section.

This section is provided to reveal information believed by the applicant to be of possible relevance. No admission is necessarily intended, nor should be construed, that any of the information in this section (and in particular, that unpublished U.S. patent application Ser. No. 15/911,168) constitutes prior art against the present invention.

The Problem to Solve

Every penetration testing system operates by iteratively (physically or simulatively) compromising network nodes of the tested networked system. At any iteration during the testing process some of the network nodes of the tested networked system are considered to be already compromised by the potential attacker, and the penetration testing system is attempting to compromise an additional network node (not yet compromised) by utilizing the already-compromised network nodes that are operating under the control of the attacker's instructions. Once an additional network node is found to be compromisable, it is added to the group of already-compromised network nodes and a new iteration begins.

As a hypothetical example, there might be malicious code circulating in cyberspace and available to potential attackers known as the "Bad 7 Trojan". This Bad 7 Trojan only compromises nodes running the Windows 7® Operating System under a specific set of circumstances, discussed below.

A penetration testing system has a frequent need to identify a vulnerability that would compromise a given network node. This identification is typically achieved by using a pre-compiled knowledge base about known vulnerabilities, that depends on characteristics of the given network node. In one example related to the Bad 7 Trojan, the penetration testing system may have in its knowledge base a rule saying that a network node running the Windows 7 Operating System might be compromised by sending it a specific network message through a specific Internet port.

However, knowing that a target network node might be compromised by a specific vulnerability is not the same as knowing for sure it would be compromised by that specific vulnerability under the current specific conditions in the target network node. For example, the target network node may have installed on it a patch provided by Microsoft for making the Windows 7 Operating System immune to that vulnerability—i.e. immune to the Bad 7 Trojan. Or the administrator of the target network node may have disabled the service that is typically using the specific Internet port (i.e. port number "XYZ") used by the specific vulnerability (i.e used by the Bad 7 Trojan) and therefore the network node is currently not listening to that specific port and is thus currently not vulnerable to anything sent to it through that specific port. Additionally, even if a target network node would be compromised by the specific vulnerability under the current conditions if it receives a certain network message through the specific port (i.e. causing the node to execute the code of the Bad 7 Trojan), it might still be the case that a firewall that is protecting the target network node is blocking the damaging network message from reaching the specific port of the target network node, thus making it non-compromisable in practice.

Therefore, it is clear that without detailed knowledge about what is going on inside the target network node it is not always possible to know for sure whether a given potential vulnerability would compromise a given network node under current conditions. This is a major issue for penetration testing systems that need to know for sure that a given network node could be compromised before reporting a penetration success. As a result, when a penetration testing system determines that a given vulnerability might compromise a given network node, it has to find a way of validating that this is indeed so under current conditions.

The common approaches adopted by prior art penetration testing systems are:

a. Validating by actual attack—testing whether the given vulnerability succeeds in compromising the target network node by actually attempting to compromise the target network node using the vulnerability, and then finding out if the network node was indeed compromised.

b. Validating by simulation or by evaluation—testing whether the given vulnerability succeeds in compromising the target network node either by simulating the tested networked system and attempting to compromise it using the vulnerability in the simulation, or by evaluating the success/failure of applying the vulnerability by using pre-compiled knowledge about the vulnerability plus fresh data about current conditions in the target network node. In both cases the validation is done without actually attempting to compromise the tested networked system.

None of the above approaches provides a fully satisfactory solution to the validation problem. The actual attack method has the severe drawback of risking actually compromising the tested networked system. Even though penetration testing systems employing this method attempt to undo any compromising operations they performed during the test, it is difficult to guarantee that full recovery will always be achieved. The simulation/evaluation method has the drawback of sometimes lacking knowledge of data that is essential for reaching a correct result. If the condition for successful compromising depends on data that is internal to the target network node (for example the version of the firmware of a storage device internal to the node), then the method cannot reliably validate the success of the compromising by the vulnerability.

A possible remedy to the drawback of the simulation/evaluation method is to employ a reconnaissance client agent for collecting information about the target network node. A reconnaissance client agent is a software module that can be installed on a network node and can be executed by a processor of that network node for partially or fully implementing the reconnaissance function of a penetration test. The reconnaissance function is the function that is in charge of the collection of data useful for the penetration testing process, and this may include the collection of data that is internal to the network node in which the agent is installed.

As an example, US Application No. 2016/0044057 (hereinafter "'057 application" or '057) to Chenette et al. discloses a penetration testing system that uses an agent software module installed in the target node (called "server" in '057), that is in charge of validation of vulnerabilities in that target node. When the penetration testing system of '057 needs to verify that a given vulnerability can compromise the target node under current conditions, an exploit payload is sent to the target node where the exploit contains code implementing the vulnerability. The agent installed on the target node receives the payload, but instead of attempting to execute the code (which would expose us to the danger of compromising the networked system by the testing process), it examines the code and determines whether the target node would have been compromised by executing it, taking into account the current state of the node and the defenses currently in place in it. As a client agent has access to internal data of the node in which it is installed, this solution solves the problem from which other evaluation-based penetration testing systems suffer, as explained above.

However, the solution of '057 suffers from other drawbacks. The client agent of '057 has to validate every type of vulnerability that is potentially applicable to the node on which it is installed. For each such vulnerability, it must implement logic for determining whether that vulnerability will succeed in compromising the node under current conditions. This logic is specific for each vulnerability and is not always simple and straight-forward. Therefore, when the number of potential vulnerabilities is high, as is usually the case, the complexity and code size of the client agent become high too. While penetration testing systems are complex systems, it is highly desirable that their complexity will reside in the central server from which the testing sessions are initiated and controlled, and will not be duplicated in code installed on each one of the many network nodes taking part in the test. Moreover, new vulnerabilities are discovered on almost a daily basis and require very frequent updates of the vulnerabilities validation logic of penetration testing systems. Having to frequently update the locally-installed agents in the many nodes of a tested networked system is a logistic nightmare and should better be avoided.

One additional drawback of the '057 method is that it relies on sending to the target node code or some other representation of the potential vulnerability. It is not always the case that a vulnerability is known to the penetration testing system with such detail. In many cases a newly-discovered vulnerability is known in general terms but not much detail is known about its implementation. In such case the agent-based '057 method cannot be used for validating success in compromising the target node by newly-discovered vulnerabilities.

There is thus a need for validating that a given vulnerability will indeed compromise a given node under current conditions, without suffering from the drawbacks described above.

SUMMARY OF EMBODIMENTS

When a penetration testing system determines that a potential vulnerability might compromise a target network node of a networked system, the penetration testing system has to find out that this is indeed so under current conditions—this is referred to as "validating."

An automated penetration testing system for carrying out a penetration testing campaign of a networked system is now disclosed. This penetration testing system (i) does not employ the "validating by actual attack" technique described above, where the target node is exposed to risk of being compromised; and (ii) in embodiments of the invention, differs from and provides advantages over systems that employ the conventional "validation by simulation or by evaluation" technique, also described above.

The presently-disclosed automated penetration testing system employs a reconnaissance agent software module (RASM) installed on at least some network nodes of the networked system, including one or more target network nodes for which validation is performed.

Instead of performing validation (i.e. for a particular target node) by executing code of the RASM on the target node (as is done by the '057 application), validation: (i) is performed on a remote computing device in communication with the target node; (ii) is performed using internal data of the target node, which is received by the remote computing device from the RASM installed in the target node. In contrast with actual attack penetration testing systems, validation is performed without exposing the target node to a risk of being compromised.

Internal data of a network node (i.e. including the target node) includes one or more of:
 (A) Internal events occurring in the network node, for example the insertion of a USB stick into the network node;
 (B) Internal conditions existing in the network node, for example whether the CPU of a given network node is heavily loaded or not; and
 (C) Internal factual data about the network node, for example the firmware version of a solid-state storage device attached to the network node.

During the penetration testing campaign, execution of code of the RASM (i.e. execution of the instance of the RASM installed on the target node—the target node may also be referred to as a 'hosting node' of that instance) makes no attempt to actually compromise the target node. Additionally, execution of the RASM on the target node does not make any determination about whether or not a potential vulnerability would succeed to compromise the target node under current conditions. Instead, execution of the RASM on the target node primarily serves to obtain and transmit data about the target node out of the target node to the remote computing device—this data includes internal data of the target node, and optionally also includes other data of the target node or data of other nodes.

For each target node, the validation decisions are left to the remote computing device, rather than to the target node. Towards this end, the remote computing device hosts and/or implements both (i) a vulnerabilities knowledge base and (ii) validation logic for the potential vulnerabilities. For each validation to be decided for a given potential vulnerability and for a given target node, the remote computing device applies the decision logic associated with the given potential vulnerability according to the vulnerabilities knowledge base using data obtained from the target node, including internal data of the target node. This internal data of the target node is first obtained at the target node by execution thereon of the RASM installed on the target node, and subsequently received by the remote computing device from the RASM installed on the target node.

In order to better understand embodiments of the invention, the reader is referred to two use case examples presented below under the following headings (within the "Detailed Description of the Embodiments"): (i) Use Case Example 1—Bad 7 Trojan; and (ii) Use Case Example 2—Potentially-Poisoned File in a Shared Folder (PPFSF) Vulnerability.

It should be noted that whenever the description of the proposed solution uses the terms "compromising a network node", "compromising a networked system", "an already-compromised network node", "a not-yet-compromised network node" and the like, no actual compromising is meant. As the proposed solution is based on simulation or evaluation rather than on an actual attack, the above terms refer to a simulated or to an evaluated compromising. For example, "compromising a network node" means determining that the network node could be compromised, and "an already-compromised network node" means a network node which was already determined to be compromisable in previous stages of the current testing process.

A method of carrying out a penetration testing campaign of a networked system by a penetration testing system is disclosed herein where the penetration testing system comprises (A) a penetration testing software module installed on a remote computing device and (B) a reconnaissance agent software module (RASM) installed on at least some network nodes of the networked system. The presently-disclosed method comprises: a. subsequent to installing the RASM on the at least some network nodes, initiating the penetration testing campaign; b. subsequent to the initiating of the penetration testing campaign, selecting a target network node of the networked system on which the RASM is installed; c. based on the target network node, selecting a potential vulnerability that may compromise the target network node; d. subsequent to the selecting of the potential vulnerability, receiving at the remote computing device and from the RASM installed on the target network node, internal data of the target network node; e. validating that the target network node could be successfully compromised using the selected potential vulnerability, the validating being carried out in a manner which does not expose the target network node to a risk of being compromised and which is based on the received internal data of the target network node; f. based on the potential vulnerability, determining a method for an attacker to compromise the target network node; g. based on the method for an attacker to compromise the target network node, determining a security vulnerability of the networked system; and h. reporting the security vulnerability of the networked system, the reporting comprising at least one of (i) causing a display device to display a report including information about the determined security vulnerability of the networked system, (ii) recording the report including the information about the determined security vulnerability of the networked system in a file, and (iii) electronically transmitting the report including the information about the determined security vulnerability of the networked system, wherein each of steps a-h is performed by executing computer code of the penetration testing software module by one or more processors of the remote computing device.

In some embodiments, the internal data includes data about an internal event of the target network node.

In some embodiments, the internal data includes data about an internal condition of the target network node.

In some embodiments, the internal data includes data about an internal fact of the target network node.

In some embodiments, the selecting of the potential vulnerability is based on one or more properties of the target node.

In some embodiments, i. the method further comprises performing the following steps, subsequent to steps b-f and before step g: A. selecting an additional target network node of the networked system on which the RASM is installed; B. based on the additional target network node, selecting an additional potential vulnerability that may compromise the additional target network node; C. subsequent to the selecting of the additional potential vulnerability, receiving at the remote computing device and from the RASM installed on the additional target network node, internal data of the additional target network node; D. validating that the additional target network node could be successfully compromised using the additional potential vulnerability, the validating being carried out in a manner which does not expose the additional target network node to a risk of being compromised and which is based on the received internal data of the additional target network node; and E. based on the additional potential vulnerability, determining a method for an attacker to compromise the additional target network node; and ii. the determining of the security vulnerability of the networked system is further based on the method for an attacker to compromise the additional target network node.

In some embodiments, the information about the determined security vulnerability of the networked system comprises at least one of: (i) information about a method for compromising the target network node (ii) information about one or more network nodes of the networked system which are vulnerable to attack, (iii) information about one or more resources of the networked system that could be damaged or exported out of the networked system by an attacker, and (iv) information about an ordered list of network nodes of the networked system, wherein an attacker could use a specific network node in said ordered list that is already compromised as a basis for compromising another network node that immediately follows said specific network node in said ordered list.

In some embodiments, the receiving of the internal data of the target network node is in response to sending by the remote computing device a message to the target network node, the message requesting specific internal data according to the selected potential vulnerability.

A method of carrying out a penetration testing campaign of a networked system by a penetration testing system is disclosed herein where the penetration testing system comprises (A) a penetration testing software module installed on a remote computing device and (B) a reconnaissance agent software module (RASM) installed on at least some network nodes of the networked system. The presently-disclosed method comprises: a. subsequent to installing the RASM on the at least some network nodes, initiating the penetration testing campaign; b. subsequent to the initiating of the penetration testing campaign, selecting a target network node of the networked system on which the RASM is installed; c. based on the target network node, selecting a potential vulnerability that may compromise the target network node; d. receiving at the remote computing device and from the RASM installed on the target network node, internal data of the target network node; e. validating that the target network node could be successfully compromised using the selected potential vulnerability, the validating being carried out in a manner which does not expose the target network node to a risk of being compromised and which is based on the received internal data of the target network node; f. based on the potential vulnerability, determining a method for an attacker to compromise the target network node; g. based on the method for an attacker to compromise the target network node, determining a security vulnerability of the networked system; and h. reporting the security vulnerability of the networked system, the reporting comprising at least one of (i) causing a display device to display a report including information about the determined security vulnerability of the networked system, (ii) recording the report including the information about the determined security vulnerability of the networked system in a file, and (iii) electronically transmitting the report including the information about the determined security vulnerability of the networked system, wherein each of steps a-h is performed by executing computer code of the penetration testing software module by one or more processors of the remote computing device.

In some embodiments, the internal data includes data about an internal event of the target network node.

In some embodiments, the internal data includes data about an internal condition of the target network node.

In some embodiments, the internal data includes data about an internal fact of the target network node.

In some embodiments, the selecting of the potential vulnerability is based on one or more properties of the target node.

In some embodiments, i. the method further comprises performing the following steps, subsequent to steps b-f and before step g: A. selecting an additional target network node of the networked system on which the RASM is installed; B. based on the additional target network node, selecting an additional potential vulnerability that may compromise the additional target network node; C. receiving at the remote computing device and from the RASM installed on the additional target network node, internal data of the additional target network node; D. validating that the additional target network node could be successfully compromised using the additional potential vulnerability, the validating being carried out in a manner which does not expose the additional target network node to a risk of being compromised and which is based on the received internal data of the additional target network node; and E. based on the additional potential vulnerability, determining a method for an attacker to compromise the additional target network node; and ii. the determining of the security vulnerability of the networked system is further based on the method for an attacker to compromise the additional target network node.

In some embodiments, the information about the determined security vulnerability of the networked system comprises at least one of: (i) information about a method for compromising the target network node (ii) information about one or more network nodes of the networked system which are vulnerable to attack, (iii) information about one or more resources of the networked system that could be damaged or exported out of the networked system by an attacker, and (iv) information about an ordered list of network nodes of the networked system, wherein an attacker could use a specific network node in said ordered list that is already compromised as a basis for compromising another network node that immediately follows said specific network node in said ordered list.

In some embodiments, the receiving of the internal data of the target network node is in response to sending by the remote computing device a message to the target network node, the message requesting specific internal data according to the selected potential vulnerability.

A penetration testing system for carrying out a penetration testing campaign of a networked system in cooperation with a reconnaissance agent software module (RASM) installed on at least some network nodes of the networked system, the penetration testing system comprising: A. a remote computing device comprising a computer memory and one or more processors, the remote computing device in electronic communication with the networked system; and B. a non-transitory computer-readable storage medium containing first, second, third, fourth, fifth, sixth, seventh and eighth program instructions of a penetration testing software module, wherein: a. execution of the first program instructions, by the one or more processors of the remote computing device and subsequent to installing the RASM on the at least some network nodes, initiates the penetration testing campaign; b. execution of the second program instructions, by the one or more processors of the remote computing device and subsequent to the initiating of the penetration testing campaign, selects a target network node of the networked system on which the RASM is installed; c. execution of the third program instructions, by the one or more processors of the remote computing device, selects, based on the target network node, a potential vulnerability that may compromise the target network node; d. execution of the fourth program instructions, by the one or more processors of the remote computing device and subsequent to the selecting of the potential vulnerability, receives at the remote computing device and from the RASM installed on the target network node, internal data of the target network node; e. execution of the fifth program instructions, by the one or more processors of the remote computing device, validates that the target network node could be successfully compromised using the selected potential vulnerability such that the validating is carried out in a manner which does not expose the target network node to a risk of being compromised and which is based on the received internal data of the target network node; f. execution of the sixth program instructions, by the one or more processors of the remote computing device, determines, based on the potential vulnerability, a method for an attacker to compromise the target network node; g. execution of the seventh program instructions, by the one or more processors of the remote computing device, determines, based on the method for an attacker to compromise the target network node, a security vulnerability of the networked system; and h. execution of the eighth program instructions, by the one or more processors of the remote computing device, reports the security vulnerability of the networked system, the reporting comprising at least one of (i) causing a display device to display a report including information about the determined security vulnerability of the networked system, (ii) recording the report including the information about the determined security vulnerability of the networked system in a file, and (iii) electronically transmitting the report including the information about the determined security vulnerability of the networked system.

A penetration testing system for carrying out a penetration testing campaign of a networked system in cooperation with a reconnaissance agent software module (RASM) installed on at least some network nodes of the networked system, the penetration testing system comprising: A. a remote computing device comprising a computer memory and one or more processors, the remote computing device in electronic communication with the networked system; and B. a non-transitory computer-readable storage medium containing first, second, third, fourth, fifth, sixth, seventh and eighth program instructions of a penetration testing software module, wherein: a. execution of the first program instructions, by the one or more processors of the remote computing device and subsequent to installing the RASM on the at least some network nodes, initiates the penetration testing campaign; b. execution of the second program instructions, by the one or more processors of the remote computing device and subsequent to the initiating of the penetration testing campaign, selects a target network node of the networked system on which the RASM is installed; c. execution of the third program instructions, by the one or more processors of the remote computing device, selects, based on the target network node, a potential vulnerability that may compromise the target network node; d. execution of the fourth program instructions, by the one or more processors of the remote computing device, receives at the remote computing device and from the RASM installed on the target network node, internal data of the target network node; e. execution of the fifth program instructions, by the one or more processors of the remote computing device, validates that the target network node could be successfully compromised using the selected potential vulnerability such that the validating is carried out in a manner which does not expose the target network node to a risk of being compromised and which is based on the received internal data of the target network node; f. execution of the sixth program instructions, by the one or more processors of the remote computing device, determines, based on the potential vulnerability, a method for an attacker to compromise the target network node; g. execution of the seventh program instructions, by the one or more processors of the remote computing device, determines, based on the method for an attacker to compromise the target network node, a security vulnerability of the networked system; and h. execution of the eighth program instructions, by the one or more processors of the remote computing device, reports the security vulnerability of the networked system, the reporting comprising at least one of (i) causing a display device to display a report including information about the determined security vulnerability of the networked system, (ii) recording the report including the information about the determined security vulnerability of the networked system in a file, and (iii) electronically transmitting the report including the information about the determined security vulnerability of the networked system.

The aforementioned architecture of a penetration testing system may be useful, for example, for minimizing the CPU burden of penetration testing imposed on each of the multiple nodes of the penetration-tested networked system. Alternatively or additionally, these software architecture features may be useful for updating—e.g. when new threats need to be added to a threat-database, there is no need to update this threat-database on each of the RASM-hosting nodes. Instead, the threat-database may be updated only on the remote computing device.

Preferably, these RASM instances are not completely autonomous, but rather obtain the internal data of the RASM-hosting network nodes and/or transmit the internal data in response to a data-requesting command received, by each of the RASM-hosting network nodes, from the remote computing device.

Similar to actual-attack penetration testing systems, actual data from the network nodes is obtained and analyzed to determine the method for the attacker to compromise the networked system.

According to embodiments of the present invention, (i) this actual data includes actual internal data; and (ii) the penetration testing is carried out based on actual internal data of the target network node without putting the target node at risk of being compromised. Thus, it is now possible to enjoy the benefits of obtaining results that are more accurate and reliable than those obtainable by conventional simulated penetration testing without suffering from the risks associated with actual attack penetration testing.

Optionally, and in some embodiments preferably, the RASM is preinstalled before the beginning of the penetration testing campaign on each of the participating nodes.

The pre-installation may make the penetration testing simpler and more reliable. The pre-installation can be closely monitored by the IT people of the organization and any problem or issue of access right can be resolved prior to the testing. Additionally, if agents are employed without being pre-installed, then they are installed instead at runtime during the testing process. This implies that the state of the tested networked system is being changed by the test and unexpected side-effects might occur.

In some embodiments of the invention, one or more (i.e. any combination of) the following features are provided:
   A. The system includes a local agent installed on multiple network nodes.
   B. The agent is installed before starting the test.
   C. Each instance of the agent collects data, including internal data of the network node on which it is installed.
   D. The system includes a remote server that does (at least) the determination of vulnerabilities.
   E. The agent reports to the server in response to the server's commands.
   F. The agent reports raw data and does not determine vulnerabilities. It is the server that does such determination.
   G. The agent collects data without risking compromising the hosting node.
   H. The remote server verifies that a potential vulnerability is indeed a vulnerability without risking compromising the networked system. This implies it is not using real attacks of the tested system.
   I. The attack process is iterative—one node at a time.

BRIEF DESCRIPTION OF THE DRAWINGS

FIGS. 7, 8, and 10A-10B are flow-charts of different methods of penetration testing of a networked system according to embodiments of the invention.

DETAILED DESCRIPTION OF EMBODIMENTS

This disclosure should be interpreted according to the definitions in the "Definitions Section" at the end of the specification. In case of a contradiction between the definitions in the "Definitions Section" at the end of the specification and other sections of this disclosure, the "Definitions Section" at the end of the specification section should prevail.

In case of a contradiction between the "Definitions Section" at the end of the specification and a definition or a description in any other document, including in another document incorporated in this disclosure by reference, the "Definitions Section" at the end of the specification should prevail, even if the definition or the description in the other document is commonly accepted by a person of ordinary skill in the art.

Figure 7:
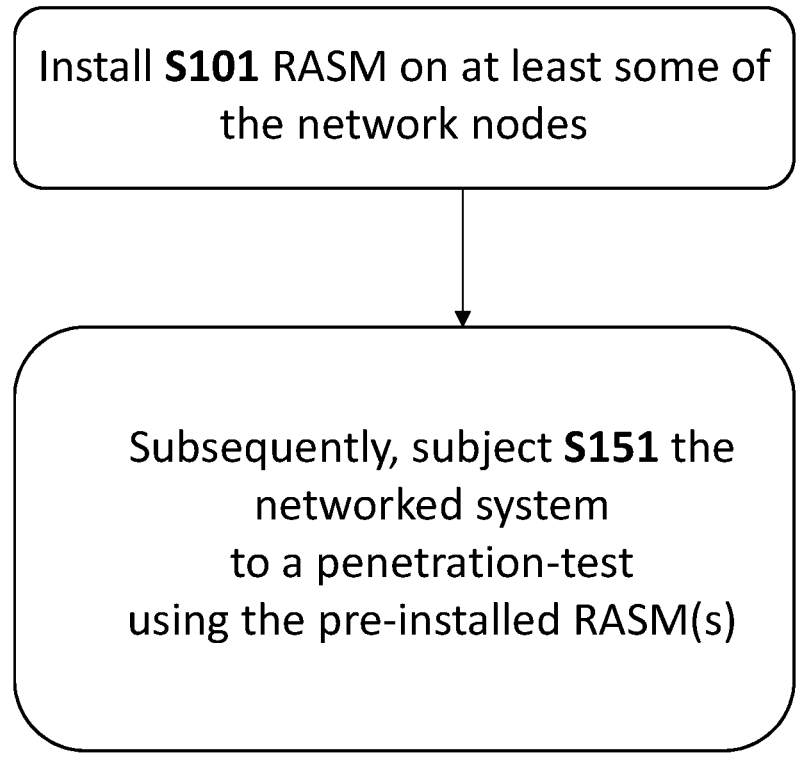
Figure 8:
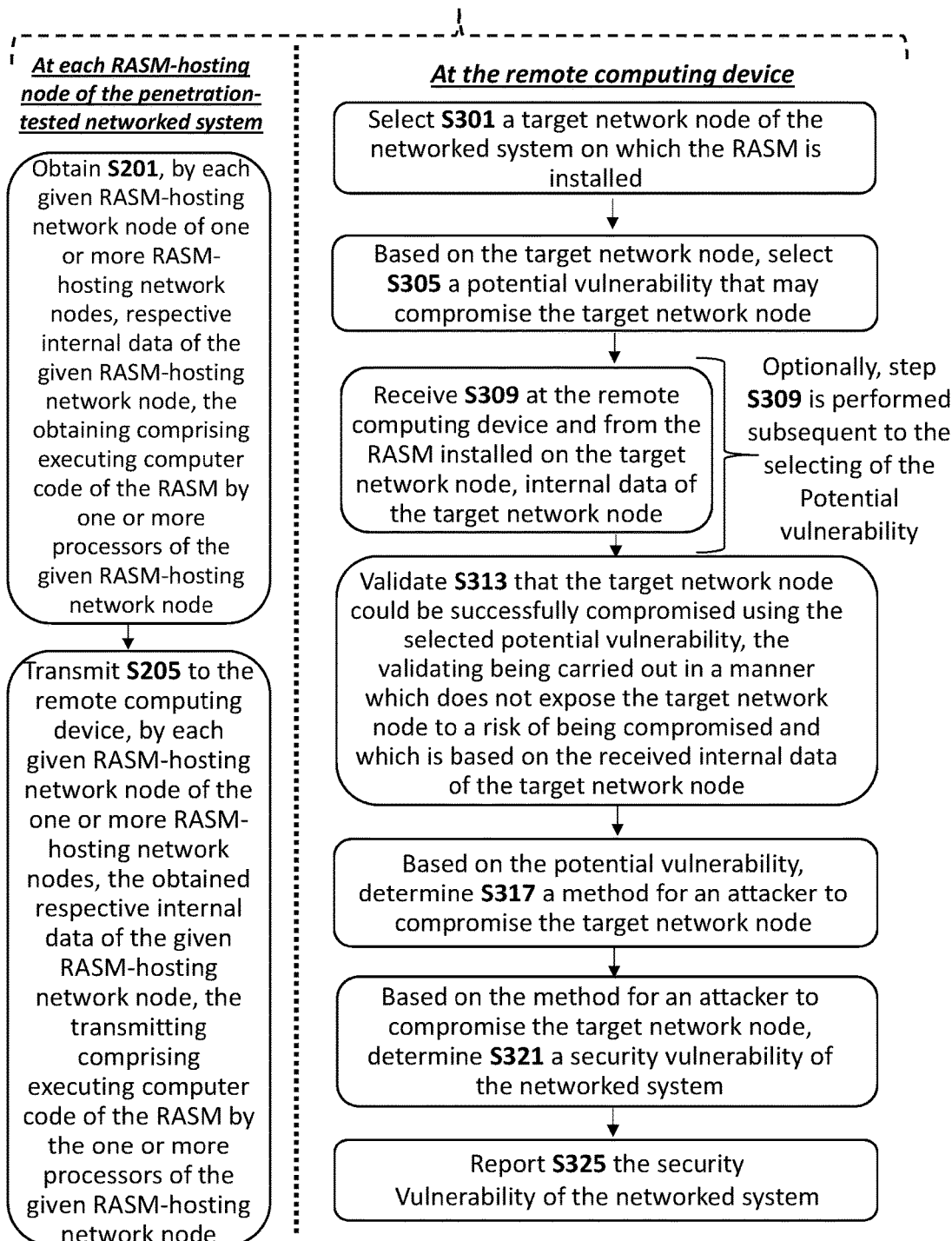

Embodiments of the invention relate to penetration testing of networked systems according to the flow-charts of FIG. 7-8. Two specific example use-cases relating to FIG. 8 are presented below in the sections entitled: (i) Use Case Example 1—Bad 7 Trojan; and (ii) Use Case Example 2—Potentially-Poisoned File in a Shared Folder (PPFSF) Vulnerability.

Figure 4:
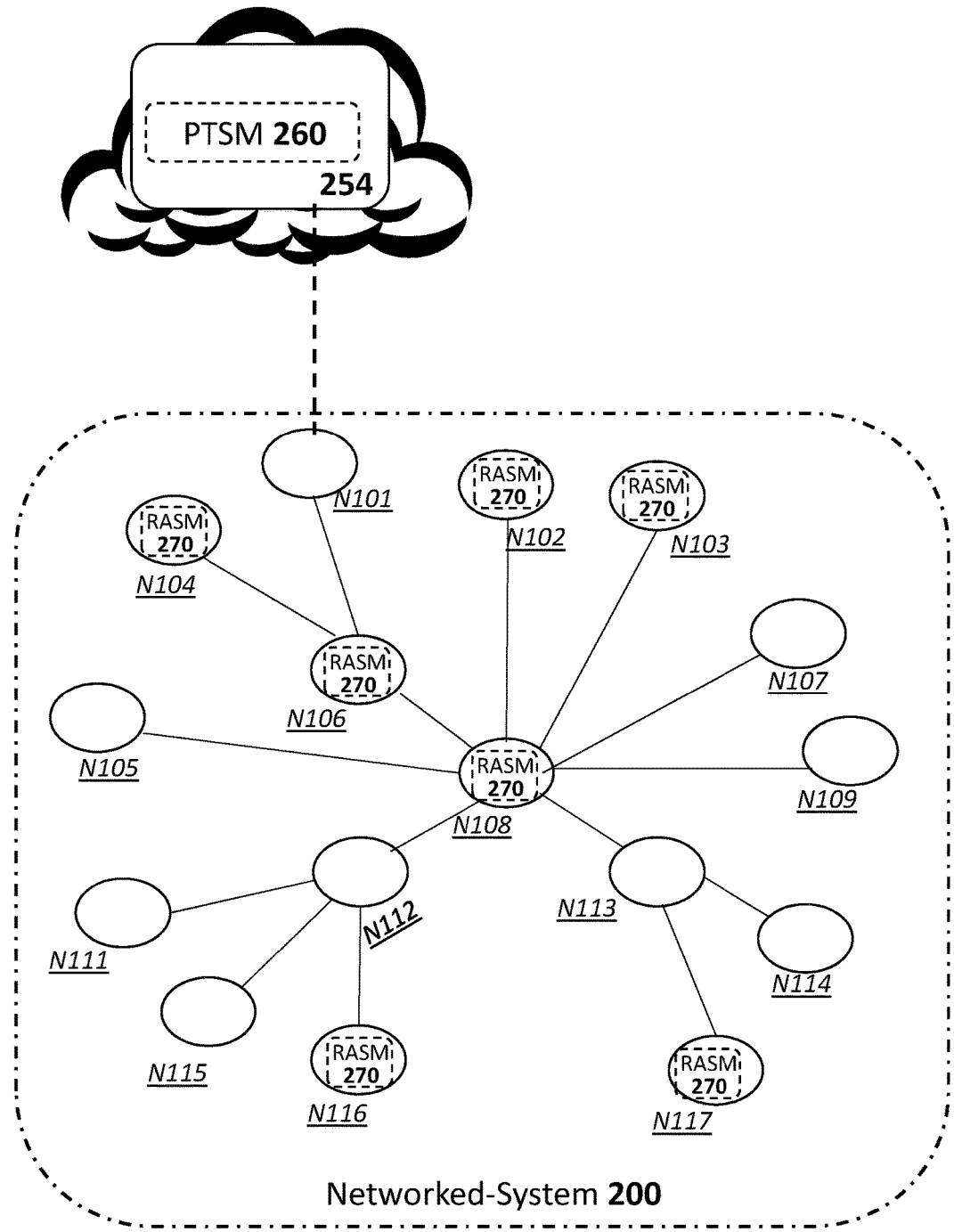
FIGS. 4-5 and 9 illustrate examples of penetration testing systems where a reconnaissance agent software module (RASM) is installed on multiple nodes of the networked system, where the RASM together with a penetration testing software module (PTSM) subject the networked system to penetration testing.
Figure 5:
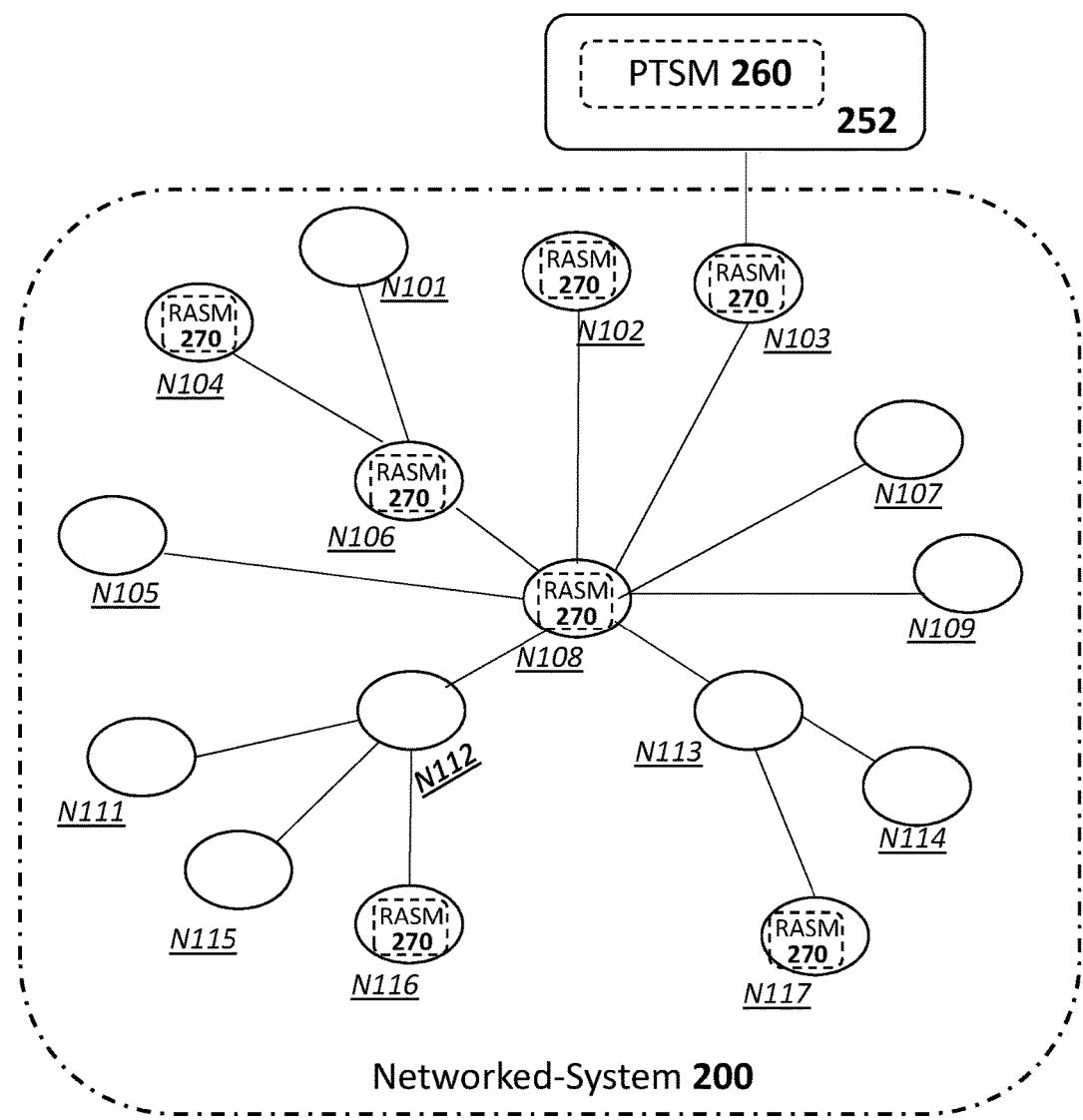
Figure 6:
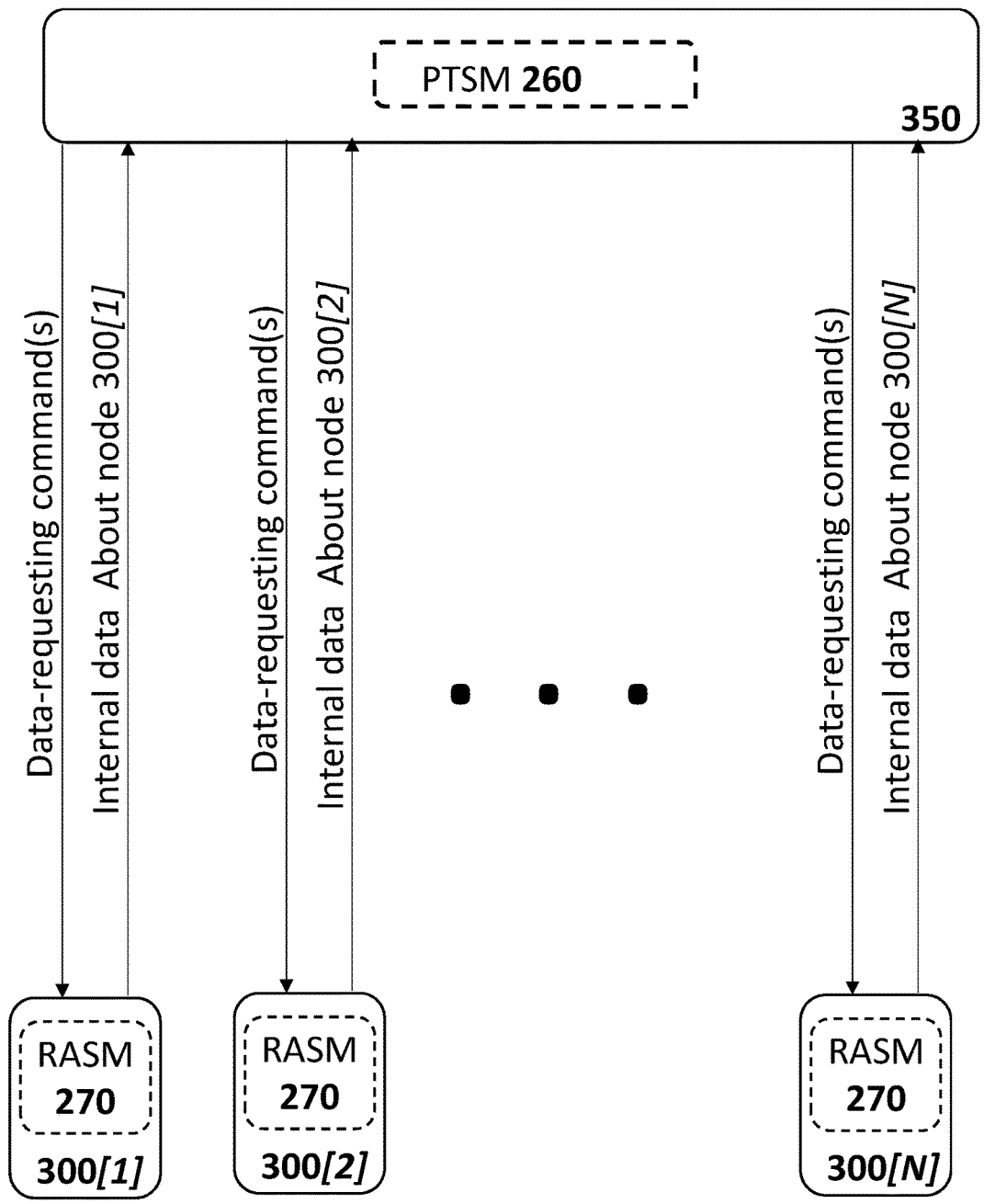
FIG. 6 illustrates communications between the PTSM and a plurality of RASMs.

Before discussing the flow-chart of FIGS. 7-8 along with the two specific example use-cases, a discussion of FIG. 4-6, which illustrate examples of penetration testing systems and components thereof, is presented.

A Discussion of FIGS. 4-6

Figure 1A:
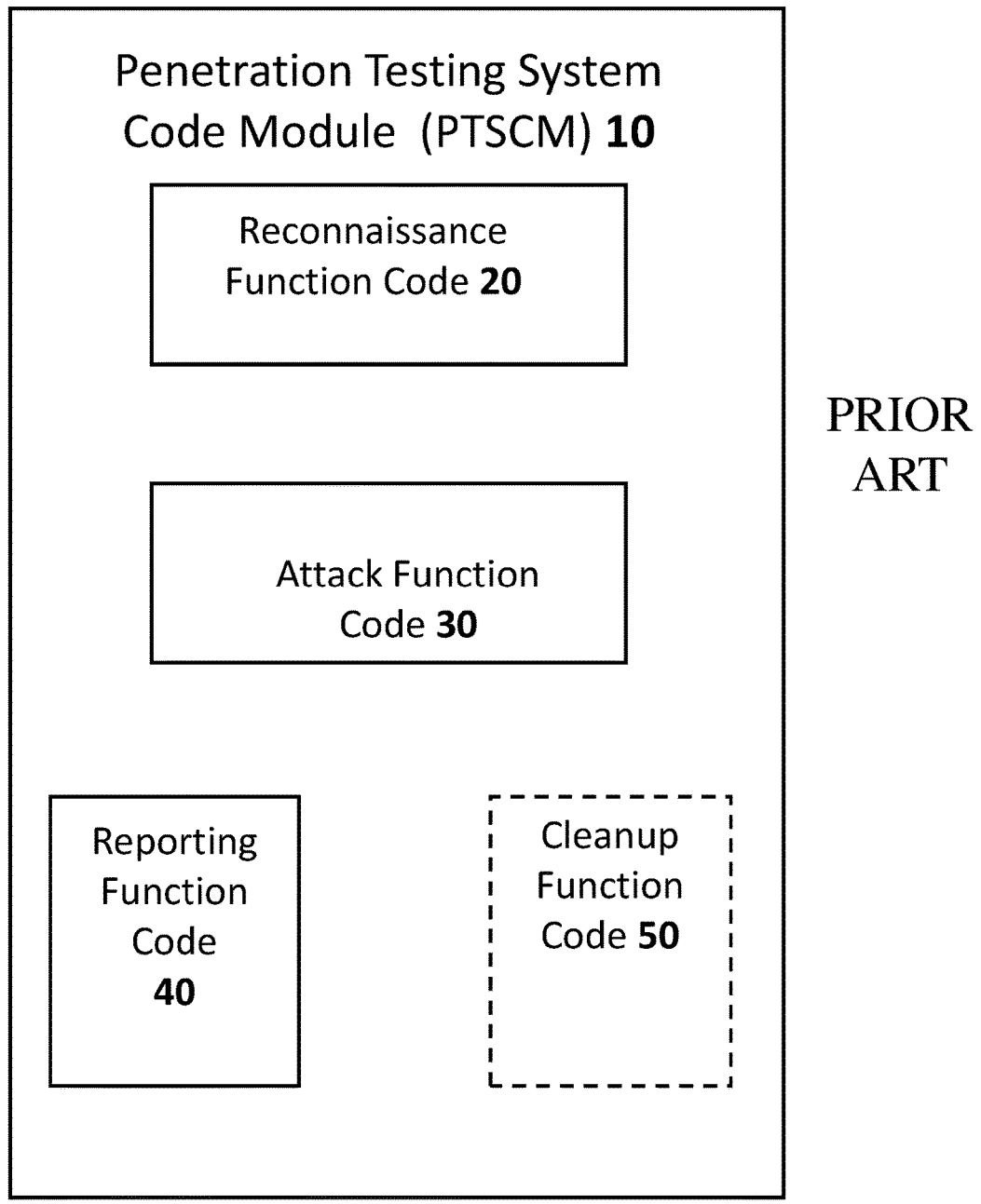
FIG. 1A (PRIOR ART) is a block diagram of code modules of a typical penetration testing system.
Figure 1B:
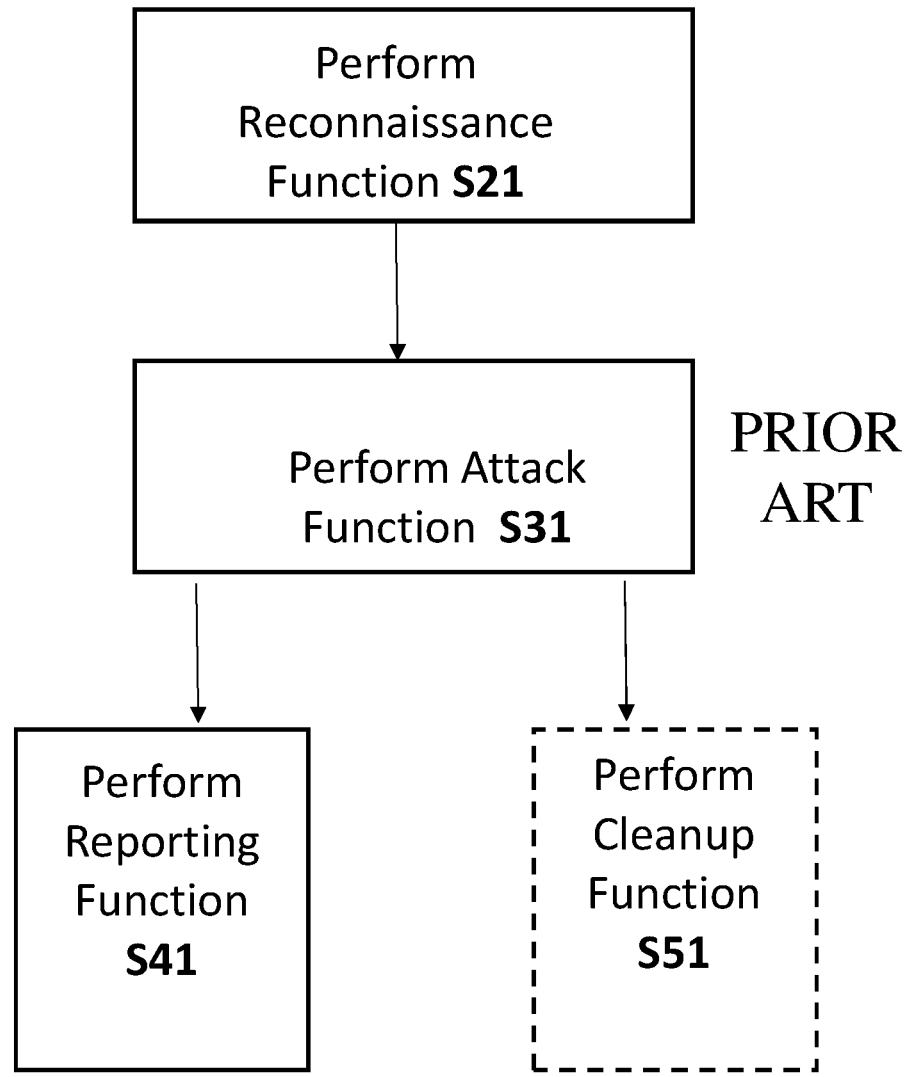
FIG. 1B (PRIOR ART) is a related flow-chart.
Figure 2:
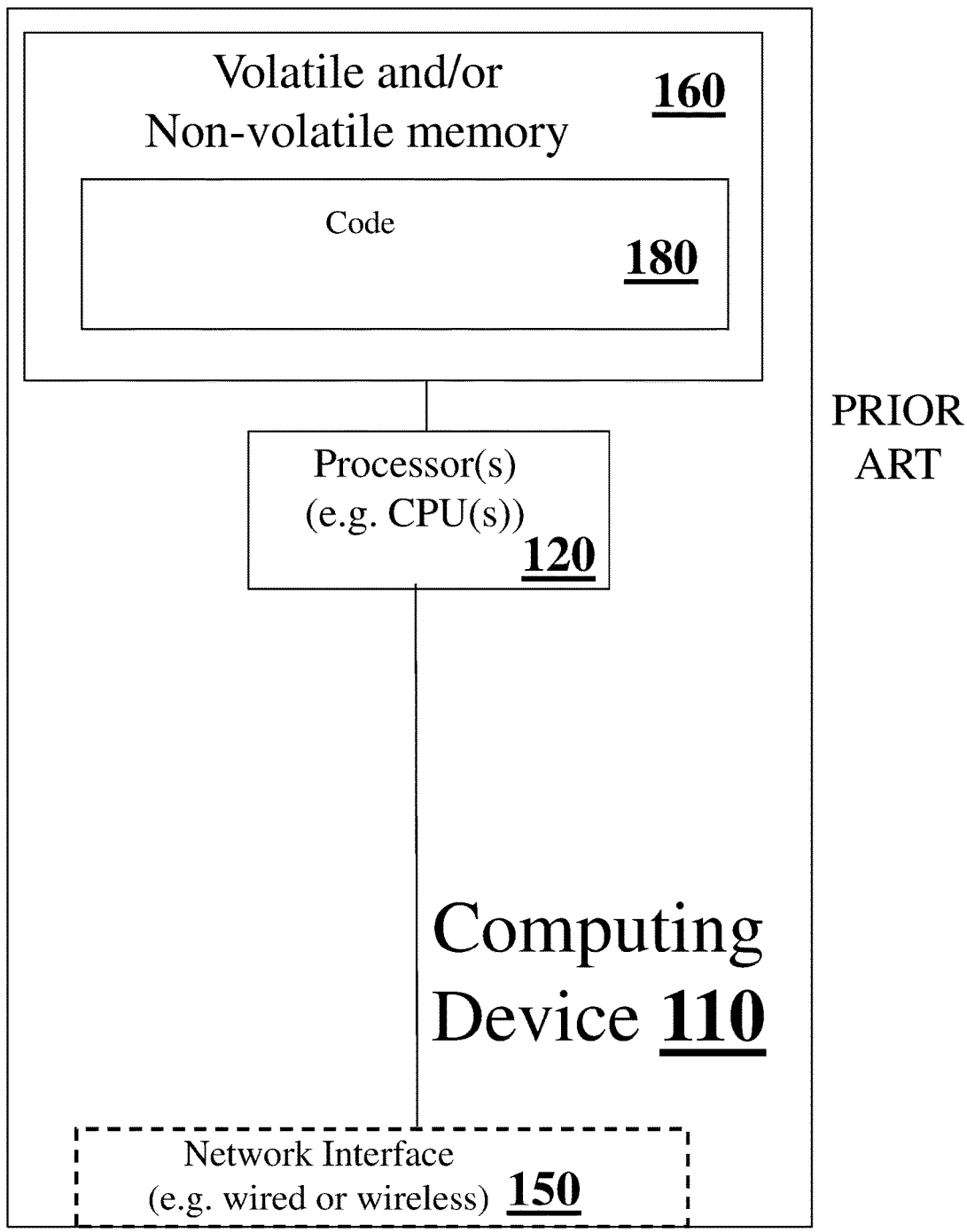
FIG. 2 (PRIOR ART) illustrates a prior art computing device.
Figure 3:
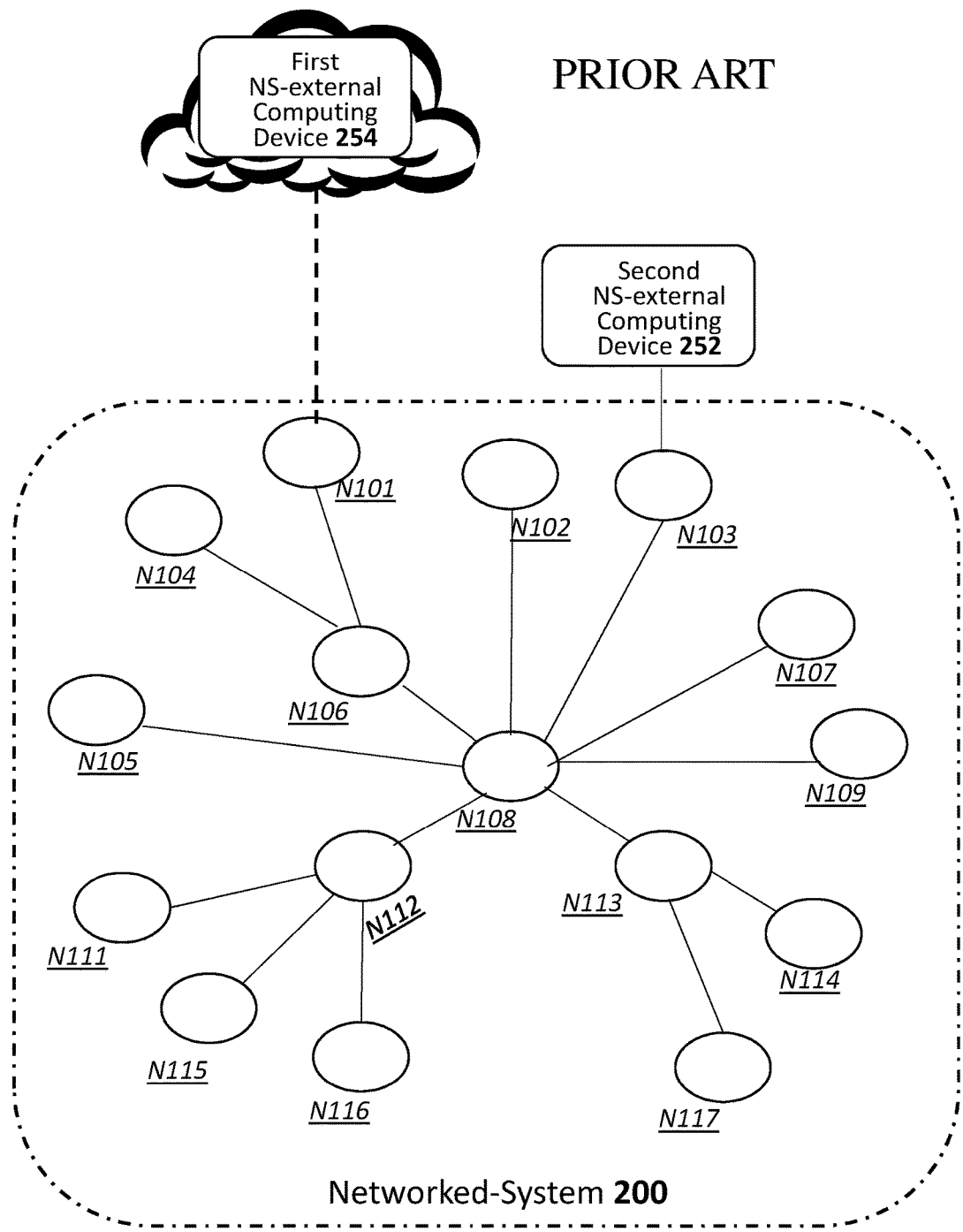
FIG. 3 (PRIOR ART) illustrates a prior art example of a networked system that may be subjected to a penetration test—the networked system comprises a plurality of network nodes.

FIG. 4-5 illustrate examples of penetration testing systems for testing networked systems, such as that illustrated in FIG. 3.

FIG. 6 illustrates communications between the PTSM and a plurality of nodes hosting the RASM.

Embodiments of the invention are described below with reference to a networked system of an organization which contains multiple network nodes. The nodes of the networked system may be of different types—different computer hardware, different operating systems, different applications, different resources (printers, communications devices, etc.), etc.

FIG. 4-5 illustrate examples of penetration testing systems according to embodiments of the invention. In each of these examples, the penetration testing system comprises a penetration testing software module (PTSM) 260 installed on a remote computing device and a reconnaissance agent software module (RASM) 270 installed on at least some network nodes of the networked system 200.

In the example of FIG. 4, the remote computing device (i.e. on which the PTSM 260 is installed) is first NS-external node 254 which is in communication with the networked system 200 by an Internet connection. In the example of FIG. 5, the remote computing device (i.e. on which the PTSM 260 is installed) is second NS-external node 252 which is in communication with the networked system 200 via a local-area network (LAN).

As noted above, any network node on which the RASM is installed is defined as a RASM-hosting network node. Thus, in the example of FIGS. 4-5, only the following nodes are RASM-hosting network nodes: N104, N106, N102, N103, N108, N116 and N117.

As will be discussed below, in embodiments of the invention, PTSM 260 and RASM 270 cooperate to collectively subject the networked system 200 to penetration testing. In different embodiments of the invention, the penetration testing test may be performed according to the methods described in any of FIGS. 7, 8, and/or 10A-10B.

For example, the penetration testing of the networked system 200 (i.e. performed by execution of PTSM 260 and RASM 270 on their respective hosts) may include both of the following operations: (i) collecting internal data by the RASM 270 of two or more network nodes of networked system 200 (e.g. each instance of RASM 270 collects respective internal data of its hosting network node and transmits this internal data to the PTSM 260); and (ii) analyzing this data by the PTSM 260 to determine a method for the attacker to compromise the networked system 200.

FIG. 6 illustrates an example where PTSM 260 is installed on a physically remote computing device 350; and the RASM is installed on each node 300[$i$] of a set of N network-nodes, {300[1], 300[2], ... 300[N]} where N is a positive integer (N≥2), and i is an index that runs between 1 and N. Each node 300[$i$] corresponds to a different node of networked system 200.

The label 350 for the remote computing device refers to any remote computing device on which the PTSM 260 is installed. As noted above, for the example of FIG. 4, remote computing device 350 corresponds to computing device 254 while in the example of FIG. 5, remote computing device 350 corresponds to computing device 252.

Thus, in the example of FIG. 6, node 300[1] (i.e. the instance of RASM 270 which is installed on node 300[1]) receives one or more data-requesting commands from remote computing device 350 (i.e. data-requesting commands issued by PTSM 260—when processor(s) of remote computer device 350 execute code of PTSM 260).

Each RASM-hosting network node 300[$i$] executes code of RASM 270. Execution of code of RASM 270 by one or more processor(s) of each RASM-hosting network node 300[$i$]: (i) obtains respective internal data specific to RASM-hosting network node 300[$i$]; and (ii) respectively transmits the internal data to the remote computing device 350 (e.g. to PTSM 260 executing on remote computing device 350).

Thus, execution by RASM-hosting network node 300[1] of code of RASM 270: (i) obtains internal data specific to node 300[1]; (ii) transmits, to remote computing device 350, the internal data specific to node 300[1]. Execution by RASM-hosting network node 300[2] of code of RASM 270: (i) obtains internal data specific to node 300[2]; (ii) transmits, to remote computing device 350, the internal data specific to node 300[2]. And so on.

The internal data specific to RASM-hosting network node 300[$i$] (i.e. i is an index that runs between 1 and N) includes data about at least one of: A. an internal event of the RASM-hosting network node 300[$i$], B. an internal condition of the RASM-hosting network node 300[$i$], and C. an internal fact of the RASM-hosting network node 300[$i$].

In the specific example of FIG. 6, the RASM-hosting network node 300[$i$] may obtain the internal data and/or transmit the internal data in response to data-requesting command(s) received by the RASM-hosting network node 300[$i$] from the remote computing device 350. For example, the obtaining of the internal data and/or the transmitting thereof may only occur if the data-requesting command(s) is received by the RASM-hosting network node 300[$i$]. In other embodiments, the RASM-hosting network node 300[$i$] may obtain the internal data and/or transmit the internal data according to a pre-defined schedule that does not depend on commands received from remote computing device 350. For example, node 300[$i$] may obtain and/or transmit data every 10 minutes regardless of receiving data-requesting commands from remote computing device 350. The independently-scheduled obtaining and/or transmitting of data may be in addition to sending data in response to commands, or it may be the only mechanism by which node 300[i] obtains and transmits data.

A Discussion of FIGS. 7-8

FIG. 7-8 are flowcharts of methods of penetration testing.

In step S101 of FIG. 7, one or more RASM instances 270 are pre-installed on one or more of (e.g. on all of) the RASM-hosting network nodes 300[i] prior to beginning of the execution of the penetration test. According to the example of FIG. 7, only after the one or more (e.g. all) of the RASM instances 270 are installed on one or more RASM-hosting network nodes 300[i] does the penetration test begin. In step S151, the networked system 200 is subjected to a penetration test using the one or more pre-installed RASM instances.

FIG. 8 is a flowchart of a method of penetration testing. Preferably, all steps (S201, S205, S301, S305, S309, S313, S317, S321 and S325) of the method of FIG. 8 are performed subsequent to the installing of step S101—thus, in some embodiments all steps S201, S205, S301, S305, S309, S313, S317, S321 and S325 may be considered an example implementation of step S151 of FIG. 7.

Steps S201 and S205 of the method of FIG. 8 are performed at each RASM-hosting node of the penetration-tested networked system—these steps are indicated on the left hand side of the FIG. 8. Steps S305, S309, S313, S317, S321 and S325 of FIG. 8 are performed at the remote computing device—e.g. computing device 254 of FIG. 4 or computing device 252 of FIG. 5 or computing device N114 of FIG. 9.

Left Hand Side of FIG. 8—Steps S201 and S205 of FIG. 8 (Performed at Each RASM-Hosting Node)

Step S201 includes obtaining, by each given RASM-hosting network node 300[i] (i.e. i is an index that runs between 1 and N) of one or more RASM-hosting network nodes of networked system 200, respective internal data of the given RASM-hosting network node 300[i]. The obtaining of step S201 comprises executing computer code of the RASM 270 by one or more processors of the given RASM-hosting network node 300[i].

The respective internal data (i.e. related to node 300[i]) includes data about at least one of: A. an internal event of the given RASM-hosting network node 300[i], B. an internal condition of the given RASM-hosting network node 300[i], and C. an internal fact of the given RASM-hosting network node 300[i].

In some embodiments, for at least one of the RASM-hosting network nodes, step S201 is performed in response to a data-requesting command received by the RASM-hosting network node from the remote computing device. In other embodiments, the RASM executing on the RASM-hosting network node may not require a data-requesting command—for example, the RASM may periodically (e.g. once every minute) update a log of internal data stored in volatile or non-volatile memory of the RASM-hosting network node.

Step S205 includes transmitting to the remote computing device 350 (e.g. 254 of FIG. 4 or 252 of FIG. 5 or 290 of FIG. 9), by each given RASM-hosting network node 300[i] of the one or more RASM-hosting network nodes of networked system 200, the obtained respective internal data of the given RASM-hosting network node 300[i]. The transmitting of step S205 comprises executing computer code of the RASM by the one or more processors of the given RASM-hosting network node 300[i].

In some embodiments, for at least one of the RASM-hosting network nodes, step S205 is performed in response to a data-requesting command received by the RASM-hosting network node from the remote computing device. In other embodiments, the RASM executing on the RASM-hosting network node may not require a data-requesting command—for example, the RASM may be programmed to periodically (e.g. once every minute) transmit internal data stored in volatile or non-volatile memory of the RASM-hosting network node from the RASM-hosting network node to the remote computing device.

Right Hand Side of FIG. 8—Steps S305, S309, S313, S317, S321 and S325 of FIG. 8 (Performed at the Remote Computing Device)

Figure 9:
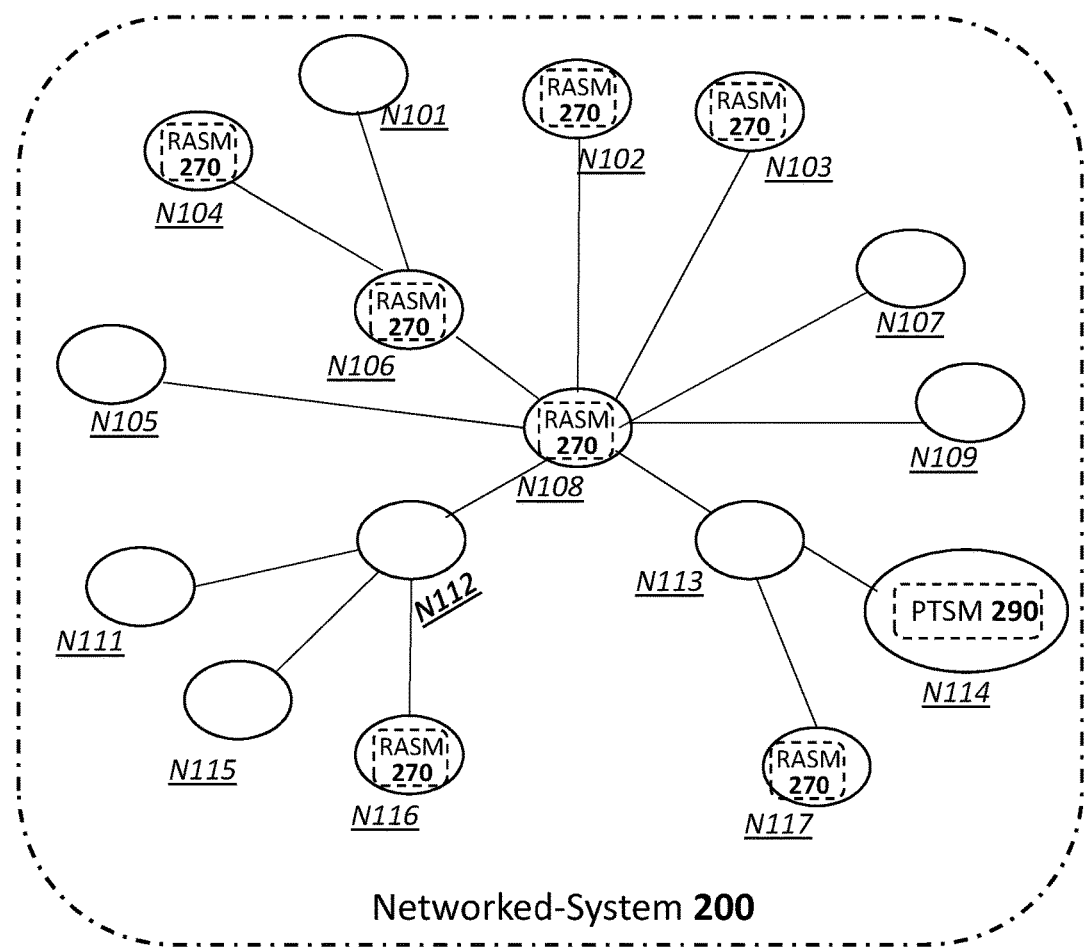

As noted above, steps S305, S309, S313, S317, S321 and S325 of FIG. 8 are performed at the remote computing device—e.g. computing device 254 of FIG. 4 or computing device 252 of FIG. 5 or computing device N114 of FIG. 9.

All of these steps are performed after the installation S101 of at the RASM on at least some of the network nodes and after initiating the penetration testing campaign. Furthermore, as discussed below, the validating of step S313 is performed in a manner that does not expose the target node (i.e. selected in step S301) to a risk of being compromised.

Thus, in step S301, a target network node is selected—i.e. a target node of the networked system on which the RASM is installed. It is this target node which is the candidate to be compromised in the next iteration of the penetration testing campaign and for which the subsequent validating step S313 is performed. Typically, the selection of the target network node is done according to a lateral movement strategy employed in the penetration testing campaign. See the definition of "lateral movement strategy" in the Definitions Section.

Alternatively, the selection of the target node can be performed in another manner—for example, if a security alert is published that a recently unleashed computer virus attacks only nodes that run a particular version of Linux®, one such node might be selected in step S301 to be the next target node.

In one particular non-limiting example, in the first iteration of the penetration testing campaign (when no network nodes are known to be compromisable) step S301 is performed to select a network node having a direct connection to the outside world—e.g. N101 of FIG. 4.

In another non-limiting example, when an iteration of the penetration testing campaign is performed after some network nodes are already known to be compromisable, step S301 is performed to select a network node that has a direct connection to one of the compromisable nodes.

In step S305, a potential vulnerability is selected based on the target node. Thus, in one example, if the target node selected in step S301 happens to be a Windows XP® node, then a vulnerability specific to MacOs® nodes would not be selected but a vulnerability specific to any Windows® node (or to Windows XP® in particular) may be selected.

In step S309, internal data of the target network node is received (e.g. data obtained in step S201 and transmitted in step S205) at the remote computing device and from the RASM installed on the target network node.

Performing step S309 subsequent to step S305 (FIRST OPTION)—Optionally, step S309 is performed subsequent to the selecting of the potential vulnerability in step S305. For example, the RASM on each node may not necessarily be completely autonomous and may perform steps S201 and/or S205 according to a data-requesting command. Performing step S309 subsequent to step S305 provides (i) the ability to the remote computing device to send such a data-requesting command specifically to the node selected in step S301 (and not, for example, broadcasting the data-requesting command to all nodes of networked system 200)—this may be useful for minimizing consumption of network resources; and (ii) to customize such a data-requesting command to request specific internal-data (i.e. from the target node) that is particularly relevant to the selected potential vulnerability The skilled artisan is directed below to "Use Case Example 1."

One potential advantage of this FIRST OPTION is that it may reduce consumption of (i) network resources and/or CPU resources at the remote computing device and/or at node(s) of system 200.

Performing step S309 before step S305 (SECOND OPTION)—Alternatively, the timing of step S309 may not depend on that of step S305—step S309 may even be performed before step S305 and may even be performed before step S301. For example, RASM instances may perform steps S201 and/or S205 without requiring any data-requesting command from the remote computing device. One potential advantage of this SECOND OPTION is that it might simplify the software architecture of PTSM 260.

The skilled artisan is directed below to the section entitled "Use Case Example 2."

A discussion of steps S313-S325 is now provided.

In step S313, the remote computing device validates that the target network node (i.e. selected in step S301) could be successfully compromised using the selected potential vulnerability (i.e. selected in step S305). The validating is based on the internal data of the target node received in step S309, and is carried out in a manner which does not expose the target network node to a risk of being compromised.

It is noted that in FIG. 8, only step S313 is qualified by the feature "is carried out in a manner which does not expose the target network node to a risk of being compromised." Nevertheless, it is understood that, all of steps S301, S305, S309, S313, S317, S321 and S325 are carried out in a manner which does not expose the target network node to a risk of being compromised. The reason that the qualifier "is carried out in a manner which does not expose the target network node to a risk of being compromised" is only provided for step S313 is that, in the field of penetration testing, it is typically the validation step that can cause the risk of compromising (i.e. when not performed in accordance with the presently disclosed teachings).

In step S317, a method for an attacker to compromise the target network node (i.e. the target node selected in step S301) is determined, by the remote computing device, based on the potential vulnerability (i.e. the vulnerability selected in step S305).

In step S321, a security vulnerability of the networked system is determined, by the remote computing device, based on the method (i.e. determined in step S317) for an attacker to compromise the target network node.

In step S325 this security vulnerability of the networked system is reported by the penetration testing system. The reporting may comprise at least one of:

(i) causing a display device [NOT SHOWN—e.g. an LCD screen or any other electronic display device] to display a report including information about the determined security vulnerability of the networked system, (ii) recording the report including the information about the determined security vulnerability of the networked system in a file, and (iii) electronically transmitting the report including the information about the determined security vulnerability of the networked system.

In different examples, the information about the determined security vulnerability of the networked system may comprise one or more of: (i) information about a method for compromising one network node of the networked system (ii) information about one or more network nodes of the networked system which are vulnerable to attack, (iii) information about one or more resources of the networked system that could be damaged or exported out of the networked system by an attacker, and (iv) information about an ordered list of network nodes of the networked system, wherein an attacker could use a specific network node in said ordered list that is already compromised as a basis for compromising another network node that immediately follows said specific network node in said ordered list.

Although not illustrated in FIG. 8, it is noted that various steps may be repeated—for example, step S301 may be repeated for a number of nodes, where for each node step S305-S313 are performed at least once. Furthermore, for a given node selected in step S301, steps S305-S313 may be performed more than once, each time for a different respective vulnerability.

In embodiments of the invention, all of steps S305, S309, S313, S317, S321 and S325 are performed by executing computer code of the PSTM by one or more processors of the remote computing device.

Logic of S305; Logic of S313

For each of the following use-cases, each of steps S305 and S313 are performed at the remote computing device. In embodiments of the invention, the logic for implemented steps S305 and S313 may be code-based—e.g. hardcoded into code of the penetration testing software module (PTSM) 260. Alternatively, the logic may be rule-based and implemented as data (e.g. as rules in a configuration file or in a relational database) accessible by PTSM 260. Alternatively, the logic may be implemented in any other manner.

For step S305, a vulnerability is a "potential vulnerability that may compromise the target network node" if and only the vulnerability is determined to compromise the target network node if certain conditions are satisfied (e.g. the vulnerability is associated with a rule that specifies the certain conditions). If information about the target node shows that the certain conditions are currently satisfied, then the potential vulnerability is known to be an actual vulnerability of the target network node under the current circumstances. The identification of the potential vulnerability that should be checked for the target network node selected in step S301 is performed by step S305, while the validation that the conditions associated with the potential vulnerability are currently satisfied, and consequently that the vulnerability could successfully compromise the target network node, is performed by step S313.

Both step S305 and step S313 are carried out by PTSM 260, which is stored in remote computing device 252 and executed by processor(s) thereof.

Use Case Example 1—Bad 7 Trojan

The skilled artisan is referred to the Bad 7 Trojan example, discussed above in the 'Problem to Solve' section.

In Use Case Example 1, there are hundreds of potential vulnerabilities which may be investigated during penetration testing, but for simplicity only three of them will be mentioned here:

(i) Macintosh Vulnerability 843, which can only compromise nodes running MacOS® (and not all MacOS® nodes);
(ii) XP Vulnerability 228, which can only compromise nodes running Windows XP® (and not all Windows XP® nodes); and
(iii) Bad 7 Trojan, which can only compromise nodes running Windows 7® (and not all Windows 7® nodes).

In Use Case Example 1, the networked system 200 of FIG. 5 is subjected to penetration testing, and the remote computing device is computing device 252.

In Use Case Example 1, two databases reside on the remote computing device 252:

A) A node OS database describing for each node, the OS type (i.e. Windows® vs. Android® vs. MacOS® vs. Linux®) and version (i.e. Windows 7® vs. Windows 8® vs. Windows 10®) executing on the node;
B) A vulnerabilities database (VDB)—for example, the vulnerabilities database may be periodically updated by the vendor of the penetration testing system according to security updates/alerts (e.g. when a certain new virus or Trojan or phishing technique becomes known to the public).

The Nodes OS database has 16 entries, one each of nodes N101-N109, N111-N117, as follows:

| Node ID | OS type | Version |
|---|---|---|
| N101 | MacOs ® X | 10.8 |
| N102 | MacOs ® X | 10.8 |
| N103 | Windows ® | 7 |
| N104 | Red Hat Enterprise Linux | 6 |
| N105 | MacOs ® X | 10.12 |
| N106 | Windows ® | 10 |
| N107 | Red Hat Enterprise Linux | 7 |
| N108 | MacOs ® X | 10.11 |
| N109 | MacOs ® X | 10.10 |
| N111 | Red Hat Enterprise Linux | 6 |
| N112 | MacOs ® X | 10.8 |
| N113 | Red Hat Enterprise Linux | 7 |
| N114 | MacOs ® X | 10.7 |
| N115 | Windows ® | 7 |
| N116 | MacOs ® X | 10.9 |
| N117 | Windows ® | 7 |

Among the hundreds of entries, there are the following 3 entries in the vulnerabilities database: (i) one entry specifically for Macintosh Vulnerability 843; (ii) one entry specifically for XP Vulnerability 228; and (iii) one entry specifically for Bad 7 Trojan. For brevity, only the entry for the Bad 7 Trojan vulnerability is now discussed.

The Bad 7 Trojan vulnerability defines both LOGIC of S305 and LOGIC of S313—in this non-limiting example, LOGIC of S305 and LOGIC of S313 are hard-coded into penetration testing software module (PTSM) 260 as follows:

I. LOGIC of S305—Bad 7 Trojan is a potential vulnerability that may compromise the target network node if and only if the target node is a Windows® 7 node—in this example, Bad 7 Trojan is a potential vulnerability that may compromise the target network node only for nodes N103, N107, N113 and N117. Only if one of these four nodes is selected in step S301 may the Bad 7 Trojan vulnerability be selected in step S305;
II. LOGIC of S313—a target node is deemed to be a node that could be successfully compromised by using the Bad 7 Trojan vulnerability (i.e. in step S313) if and only all of the following conditions are true (in addition to the Windows 7 condition that was already checked in step S305):

A. A given Microsoft® security patch must not been installed on the node;
B. Port XYZ is open to receive incoming network messages;

In this particular example, instances of the RASM are preinstalled on all of nodes N101-N109 and N111-N117 on Dec. 18, 2017 at 9 AM. Penetration testing begins at Dec. 18, 2017 at 10 AM.

In this example, RASM instances on each of nodes N101-N109 and N111-N117 (i.e. whose code is executed thereof) perform step S201 on all 16 of these nodes, no earlier than 10 AM.

In step S301 (performed at 11:01 AM) the remote computing device selects a node having a direct connection to the outside world—for example node N103.

A lookup of the Nodes OS database indicates that this node is a Windows® 7 node—the only relevant entry in the vulnerabilities database (VDB) is the Bad 7 Trojan Vulnerability entry.

Because Node N103 is a Windows® 7 node, the potential vulnerability selected (i.e. according to LOGIC of S305) in step S305 is the Bad 7 Trojan Vulnerability. Step S305 is carried out at 11:02 AM.

In this particular example, before carrying out step S309 but subsequent to carrying out step S305, a single data-request command is sent from remote device 252 to node N103 at 11:03 AM.

In this particular iteration of the penetration testing campaign of this particular example, step S205 is performed only in node N103.

In step S205 as performed by node N103, the following data is transmitted at 11:04 AM from node N103 to remote computing device 252:

(i) whether or not the given Microsoft security patch has been installed on node N103—in this example, the security patch data is internal data of node N103;
(ii) whether or not Port XYZ of node N103 is currently open to receive incoming network messages—in this example, the port status data is internal data of node N103;

Other data may also be transmitted from node N103 to remote computing device 252. All of the transmitted data is received at 11:04 AM at remote device 252 in step S309. Thus, in this example, both of steps S205 and S309 are performed at 11:04 AM.

In this use case example, it turns out that: (i) the given security patch is not installed in node N103; and (ii) port XYZ of node N103 is open to use at the current time.

Therefore, in step S313, when the entry for the Bad 7 Trojan Vulnerability of the VDB is applied to the data for node N103 received in step S309, the result is YES (i.e. the vulnerability would succeed in compromising node N103)—this is according to LOGIC of S313.

In step S317 a method for an attacker to compromise the target network node N103 is determined to be sending to port XYZ of node N103 a specific network message causing node N103 to download (i.e. from a known repository of Bad 7 Trojan) and execute the Bad 7 Trojan malicious code.

Subsequently, in step S321 it is determined that networked system 200 suffers from a security vulnerability that includes the use of Bad 7 Trojan to compromise node N103. It should be emphasized that the discovery that node N103 is vulnerable to the Bad 7 Trojan may be just one step in the discovery of the vulnerability of networked system 200. For example, the goal of the penetration testing campaign may be to compromise node N116 (which may be the CEO's computer), and the compromising of node N103 is just a necessary first step for the attacker to reach node N116. The other steps of the method to compromise the networked system by reaching node N116 are each determined using another iteration of the campaign, where in each iteration a new target node is selected, then a new potential vulnerability for compromising that new node is selected, and then the new potential vulnerability is validated to be able to compromise the new target node under the current conditions.

In step S325, an email message is sent to the system administrator's mobile phone with the following text "Campaign detected a security vulnerability. For more details see the reports screen."

First Additional Comment About Use Case Example 1—because step S309 is performed after step S301, it is possible for the remote computing device to target only node N103 with a data-requesting command (as noted above, this command was sent at 11:03 AM). This may obviate the need to broadcast such a command to multiple nodes, reducing consumption of network resources. This may also obviate the need to consume CPU cycles (i.e. for the purpose of penetration testing) at other nodes other than node N103.

Second Additional Comment About Use Case Example 1—because step S309 is performed after step S305, it is possible to customize the data-requesting command sent at 11:03 AM to only request data relevant to the Bad 7 Trojan Vulnerability. This may reduce consumption of CPU resources of Node N103 and/or network resources.

Use Case Example 2—Potentially-Poisoned File in a Shared Folder (PPFSF) Vulnerability Similar to Use Case Example 1, in Use Case Example 2, the networked system 200 of FIG. 5 is subjected to penetration testing, and the remote computing device is computing device 252.

In Use Case Example 2, there are hundreds of potential vulnerabilities which may be investigated during penetration testing, but for simplicity only one of them will be mentioned here: the PPFSF vulnerability.

It is known in the art that some nodes can access files residing in a shared folder that is accessible to multiple nodes. The shared folder may physically reside outside of a given network node and is accessible to it either via a LAN or a WAN. Sometimes, these files may be poisoned—i.e. include malicious code. Generally speaking, one technique for attacking well-defended nodes may relate to exploiting such vulnerability—even if a hostile attacker is unable to directly upload malicious code to a node, s/he may succeed in achieving this aim indirectly.

This may be achieved as follows: (i) first, the hostile attacker may compromise a node that is poorly-defended (i.e. a node where the latest security patches have not been installed) that hosts (or at least has write access to) a shared folder from which the well-defended node is known to execute files. Because the node is poorly defended, the compromising has a good chance of success; (ii) then the hostile attacker may cause the compromised node to write a malicious executable file to the shared folder; and (iii) subsequently, even a well-defended node may be compromised if it executes files read from the shared folder.

Potentially Poisoned Executable-File vulnerability in a shared folder—The next example relates to the "potentially-poisoned file in a shared folder" (PPFSF) vulnerability—i.e. a vulnerability that can compromise a node which executes, via LAN or WAN, executable files that reside in a shared folder.

Networked System/Penetration Testing System for Example 2: The networked system 200 of the second non-limiting example has all of the following properties: (i) the networked system comprises a plurality of laptop or desktop work-stations, each of which is a network node; (ii) some of the network nodes have access to a shared folder SF which resides on a file-server on one of the nodes ("Node S"); (iii) some of the network nodes have read-only access to the shared folder SF on Node S—i.e. the nodes with read-only access can read files from the shared folder SF but cannot modify these files, and cannot add files to the shared folder SF; (iv) some nodes have both read and write privileges to shared folder SF—these nodes can modify existing files within the shared folder SF and can add new files to shared folder SF, in addition to having read access to shared folder SF; (v) nodes with read-only access and nodes that have both read and write privileges are "nodes having at least read privileges"; (vi) nodes having at least read privileges of the folder can import and execute .exe executable files from the shared folder SF, and can import and open MS-Word® files that contain auto-executing macros from the shared folder SF—i.e. content or macros of these files are read into local memory of each such node and executed from the local memory; (vii) a first work-station/node ("Node A") is "strongly defended"—on this work-station/node the most recent version of Windows® is installed including all of the latest security patches; (viii) a second work-station/node ("Node B") is "weakly defended"—on this node, a much older version of Window has been installed, and security patches have not been installed for over two years; (ix) Node A has read-only access to shared folder SF; (x) Node B has both read and write privileges to shared folder SF.

This networked system is subjected to penetration testing.

In this example, (i) Node A is N108 (for the present example, "Node A" and N108 are interchangeable); (ii) Node S is N113 (for the present example, "Node S" and N113 are interchangeable) and (iii) Node B is N117 (for the present example, "Node B" and N117 are interchangeable).

In this networked system, access privileges to shared folder SF are controlled by a system administrator, and are published in a table entitled "Access Privilege Table for SF on N113 (APT-SF-N113)"—the table is freely available to any node of system 200, and to any external node having a password—in this case, the password (i.e. for reading the table) is provided to the remote computing device 252.

The content of table APT-SF-N113 is as follows:

| Node ID | Access Privileges |
| --- | --- |
| N101 | None |
| N102 | None |
| N103 | None |
| N104 | None |
| N105 | None |
| N106 | None |
| N107 | None |
| N108 | Read and write |
| N109 | None |
| N111 | None |
| N112 | None |
| N113 | Read and write |
| N114 | None |

-continued

| Node ID | Access Privileges |
|---------|-------------------|
| N115 | None |
| N116 | None |
| N117 | Read and write |

In this example, there is only a single shared folder within the entirety of networked system 200. In this example, the following rules are enforced (e.g. hardcoded into penetration testing software module (PTSM) 260) on the remote device:
  I. LOGIC of S305—in step S305 (discussed below), the PPFSF vulnerability is a potential vulnerability that may compromise the target network node if and only if the target node (i) has at least read access via the LAN to a given shared folder on another node (the 'folder-hosting node'); (ii) an additional node other than the target node (which may be the folder-hosting node) has write access to the given shared folder;
  II. LOGIC of S313—a target node is deemed as a node that could be successfully compromised by using the PPFSF potential vulnerability (i.e. in step S313) if and only if all of the following conditions are true:
    A. The target node is determined to periodically read an executable file residing in the shared folder; and
    B. The target node is determined to execute the executable file whenever reading it from the shared folder.

Timing of Steps S201 and S205 of Penetration Testing Campaign for Example 2:

In this second example, the penetration testing campaign commences at 1 PM on Apr. 21, 2017. Thus, in this example the "Commencement Time" is 1 PM on Apr. 21, 2017. Prior to the Commencement Time, the RASM is pre-installed on each node of the networked system, including Node A which is strongly-defended and Node B which is weakly-defended.

Immediately after the Commencement Time, the table APT-SF-N113 is read by the PTSM—in this example, the content of APT-SF-N113 never changes during the penetration testing campaign.

During the ten-hour penetration testing campaign, processor(s) of Node A execute (i.e. in step S201) code of the RASM both to ascertain status data of Node A and to "listen" to events which occur at Node A. The status data may include: (i) a version of an operating system executing on Node A; (ii) which security patches have been installed on Node A. The events may include execution of an executable file by processors of Node A, opening of an MS-Word® file or an MS-Excel® file (applications which support macros) on Node A, mouse and keyboard events on Node A, reading a file from the shared folder SF (i.e. on Node S) into Node A, execution of a file read from the shared folder SF into Node A.

Similarly, processor(s) of Node B (i.e. in step S201) execute code of the RASM both to ascertain status data of Node B and to "listen" to events which occur at Node B.

In this example, at 1:01 PM Node A (i.e. by executing code of the RASM) transmits (i.e. in step S205) to the remote computing device "Windows version/update data" for Node A—the Windows version/update data transmitted from Node A indicates that the most recent version of Windows® including all of the latest security patches is installed on Node A.

In this example, at 1:02 PM Node B (i.e. by executing code of the RASM) transmits (i.e. in step S205) to the remote computing device "Windows version/update data" for Node B—the Windows® version/update data transmitted from Node B indicates that (i) an older version of Windows® is installed on Node B and (ii) the most recent security patch installed on Node B is over two years old.

In this example, RASM code executing on Node A records the following events i.e. recorded in step S201 and transmitted in step S205)—every 60 minutes (e.g. at 1:30, at 2:30, at 3:30, etc.) Node A reads an executable file named "hourly_test.exe" from shared folder SF and executes it.

Broadcast of Data-Requesting Command; Response to Data-Requesting Commands for Example 2

At 7:56 PM, as part of the penetration testing, the remote computing device broadcasts a data-requesting command to all nodes, including Nodes A and B.

At 7:57 PM, Node A responds to this broadcast data-requesting command by transmitting (i.e. via the Internet), to the remote computing device, the status data and the events data of Node A, both of which are stored in volatile and/or non-volatile storage of Node A.

At 7:58 PM, Node B responds to this broadcast data-requesting command by transmitting (i.e. via the Internet), to the remote computing device, the status data and the events data of Node B, both of which are stored in volatile and/or non-volatile storage of Node B.

A discussion of steps S301-S325, each performed by the remote computing device 252, is now presented.

At 7:59 PM, in step S309, the remote computing device receives the following data:
  A) status data and the events data of Node A, both of which were transmitted at 7:57 PM from Node A, as mentioned above; and
  B) status data and the events data of Node B, both of which were transmitted at 7:58 PM from Node B, as mentioned above;

In step S301, Node A (N108) is selected from the plurality of nodes of system 200. In one non-limiting example, Node A is selected because it was determined to be a well-defended node, which might indicate it contains important assets.

In step S305, performed at 8:02 PM, the PPFSF vulnerability is selected (i.e. according to LOGIC of S305) as a potential vulnerability for compromising Node A. The selection of the PPFSF vulnerability is based on the following:
  (i) Based on the APT-SF-N113 table, Node A has read access to shared folder SF.
  (ii) Based on the APT-SF-N113 table, Node B has write access to shared folder SF.
  (iii) According to the current state of the penetration testing campaign, Node B is already determined to be compromisable.

The above findings indicate that the PPFSF vulnerability is a potential vulnerability for compromising Node A. It is only a "potential" vulnerability, because it is still not known at this stage whether the condition of Node A reading and executing executable files from shared folder SF is satisfied.

In step S313, performed at 8:05 PM, LOGIC of S313 at the remote computing device, analyzes the input data received at 7:59 PM in step S309 in order to check whether the PPFSF vulnerability can compromise Node A under the current circumstances. The input data includes the reporting from Node A that an executable file from shared folder SF is periodically retrieved and executed by Node A.

This analysis, which is performed exclusively at the remote computing device, is effective to conclude that Node A could be compromised by the PPFSF vulnerability, because Node B (which is already determined to be compromisable) can replace the executable file periodically executed by Node A by a poisoned version, that when executed by Node A would result in Node A being compromised.

In step S317 performed at 8:06 PM, the penetration testing software module can now determine that there is a method for an attacker to compromise the target network node—i.e. N108 (Node A). The method to compromise is as follows: (i) take advantage of the fact that Node B is already found to be compromisable, (ii) get Node B to download a poisoned executable file from the attacker's website and store it on Node B, (iii) In the next time of detecting that Node B writes into the shared folder SF, get Node B to replace the existing executable file "hourly_test.exe" in the shared folder SF by the poisoned file, leaving a poisoned "hourly-test.exe" file in the shared folder SF.

Subsequently, in step S321 it is determined that networked system 200 suffers from a security vulnerability that includes the use of the PPFSF vulnerability to compromise Node A. It should be emphasized that the discovery that Node A is vulnerable to the PPFSF vulnerability may be just one step in the discovery of the vulnerability of networked system 200. For example, the goal of the penetration testing campaign may be to compromise node N116 (which may be the CEO's computer), and the compromising of Node A is just a necessary first step for the attacker to reach node N116. The other steps of the method to compromise the networked system by reaching node N116 are each determined using another iteration of the campaign, where in each iteration a new target node is selected, then a new potential vulnerability for compromising that new node is selected, and then the new potential vulnerability is validated to be able to compromise the new target node under the current conditions.

In step S325, an email message is sent to the system adminstrator's mobile phone with the following text "Campaign detected a security vulnerability. For more details see the reports screen."

First Additional Comment About Use Case Example 2—because step S309 is performed before step S301, reports are obtained by the remote computing device from all network nodes, and not only from Node A, which at the time of performing step S309 is not yet selected to be the next target node.

Second Additional Comment About Use Case Example 2—because step S309 is performed before step S305, it is not possible to customize data-requesting commands that trigger data reports from network nodes, as at the time of performing step S309 it is not yet known which vulnerability will be the selected potential vulnerability.

A Discussion of FIG. 9

In the example of FIG. 9, the remote computing device (i.e. on which the PTSM 290 is installed) is one of the nodes of the networked system 200—in this case node N114. For example, PTSM 290 may run on a virtual machine installed on top of the Operating System of node N114. Optionally, no RASM 270 is installed on the node N114.

First Additional Discussion

The proposed solution is a penetration testing system that uses a reconnaissance client agent that is installed in the network nodes of the tested networked system and reports (among other things) current internal data of its hosting network nodes. However, unlike in the '057 solution, in the proposed solution the validation of the success of a potential vulnerability in compromising a target network node is decided by code executing in the central server managing the penetration testing process and not by code of the agent executing in the target network node.

U.S. Provisional Patent Application No. 62/451,850 by the same inventors which is assigned to the same assignee as the current application and titled "Penetration Testing of a Networked System", discloses an architecture of an automated penetration testing system that is using reconnaissance client agents able to collect internal data of their hosting network nodes, as is required according to embodiments of the invention. Application '850 is herein incorporated into this application by reference with the same force and effect as if set forth herein.

As already explained, a reconnaissance client agent is a software module designed to be installed in nodes of the tested networked system. Such reconnaissance client agent is able to communicate with a central server managing the testing process and executing the penetration testing code and to report to the central server data extracted by the agent from its surroundings. The extracted data includes (but is not necessarily limited to) current data about the hosting node, and specifically current data that is internal to the hosting node.

In embodiments of the invention, the reconnaissance client agent makes no attempt of actually compromising its hosting network node using a given vulnerability. Additionally, in embodiments of the invention the reconnaissance client agent makes no determinations whether a given vulnerability would succeed to compromise the hosting node under current conditions. It only reports factual data about the hosting node (and possibly also about other network elements), leaving all validation decisions to the remote server. The remote server is the device containing the vulnerabilities knowledge base and the validation logic for all potential vulnerabilities. For each validation to be decided for a given vulnerability and a given network node, the server applies the decision logic associated with the given vulnerability using the data collected and reported by the reconnaissance client agent installed on the given node.

For example, the penetration testing server, in embodiments of the invention, retrieves from its vulnerabilities knowledge base a rule for deciding the success of compromising a target node using the given vulnerability. In this example, the rule says that a Windows 7 node is compromisable by that vulnerability if and only if (i) it does not a have a given OS patch installed, and (ii) the Internet port associated with the vulnerability is in use. The server then queries the reconnaissance client agent installed on that node or reviews the most recently report received from the reconnaissance client agent installed on that node, and then checks whether those two conditions are currently satisfied. Only if both conditions are satisfied will the server conclude that the compromising of the node would have been successful.

According to embodiments of the invention, the steps of each iteration of the penetration testing process may be:

a. Data is collected from the reconnaissance client agents installed on all already-compromised nodes. The data collected from the already-compromised nodes may include data about not-yet-compromised nodes, as long as this data can be obtained by any attacker controlling the already-compromised nodes. For example, data may be obtained by querying the not-yet-compromised domain controller or file server by an already-compromised node.

b. Based on the collected data and the vulnerabilities knowledge base in the server, the server chooses the node that will be the next target for compromising.

c. Based on the chosen target node, the server chooses a vulnerability that is highly likely (and preferably the most likely) to succeed in compromising the chosen target node.

d. Based on the chosen vulnerability, the server collects data from the reconnaissance client agent installed on the chosen target node. The collected data includes data of the chosen target node (including internal data) that is required for validating the success of compromising the chosen target node by the chosen vulnerability according to the specific rules associated with the chosen vulnerability.

e. Based on the collected data, the server determines whether the compromising of the chosen target node would have succeeded under the current conditions.

Note that during the first step in the above list of steps data is collected only from agents installed in already-compromised nodes, but not from agents installed in not-yet-compromised nodes, and specifically not from the agent installed on the not-yet-compromised node that would become the target node in the second step. This is because we want to emulate the capabilities of a potential attacker, and an attacker would be able to collect data (including internal data) from the already-compromised nodes that it already controls, but not from the not-yet-compromised nodes.

However, in the fourth step we do collect data (including internal data) from the reconnaissance client agent installed in the not-yet-compromised chosen target node. This is allowed because we are only using such data for finding out the success or failure of compromising that node and not for extending the capabilities of the attacker.

Similarly, it is allowed to use data from agents installed on not-yet-compromised nodes even in the first step, provided that such data is only used for speeding up determining factual findings that an attacker would be able to determine, even if with higher effort. For example, an attacker can determine which Internet ports are open in a not-yet-compromised node by instructing an already-compromised node to run a port scanning operation on the not-yet-compromised node. However, it is more efficient for the penetration testing system to obtain the open ports list directly from the agent installed on the not-yet-compromised node, for which this is a relatively simple task, rather than from an agent installed on an already-compromised node that would have to run a port scanning operation, which is a longer and heavier task. Taking such "shortcut" in obtaining the data does not change the end results of the penetration test but saves time in reaching those end results.

Figure 10B:
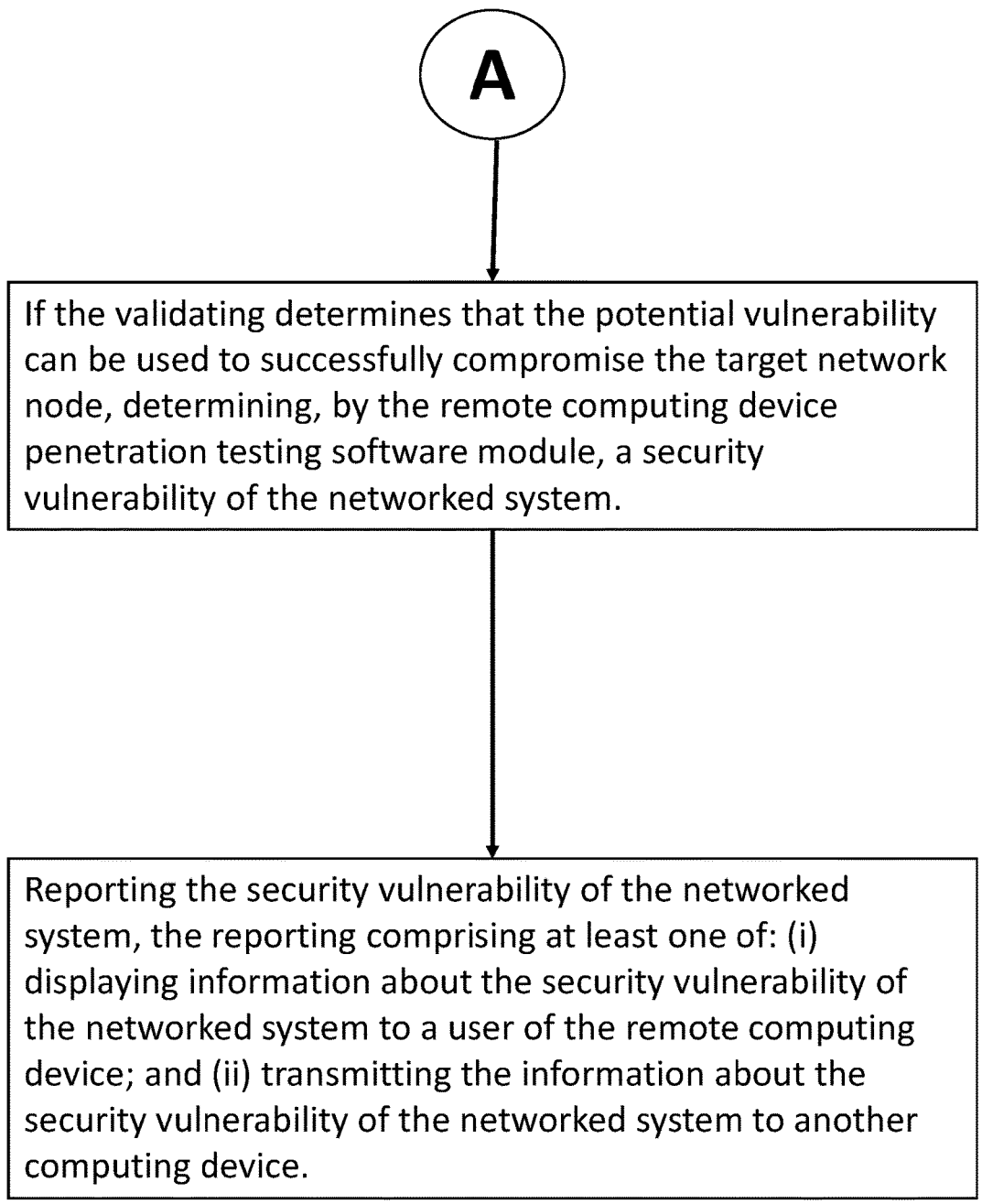

This additional discussion is presented with reference to FIGS. 10A-10B, which illustrate a method that is useful for discovering and reporting a security vulnerability of a networked system by a penetration testing system, the networked system comprising a plurality of network nodes.

Second Additional Discussion

The penetration testing system of the present disclosure comprises:

(A) a reconnaissance agent software module installed on multiple network nodes of the plurality of network nodes prior to starting a penetration test of the networked system, wherein the reconnaissance agent software module is operable, when installed on a network node, to do at least (i) collect internal data of the network node, and (ii) transmit the internal data out of the network node, and (B) a remote computing device penetration testing software module installed on a remote computing device, wherein the remote computing device is operable at least to (i) communicate with at least one network node of the multiple network nodes on which the reconnaissance agent software module is installed, and (ii) receive the internal data transmitted out of the multiple network nodes, In embodiments of the invention, the method of the present disclosure comprises:

a. executing a penetration test of the networked system by the penetration testing system, the executing of the penetration test comprising:

i. selecting, by the remote computing device penetration testing software module, a target network node of the multiple network nodes to be the next network node for which the penetration test should check whether it can be compromised;

ii. selecting, by the remote computing device penetration testing software module, a potential vulnerability that may compromise the target network node;

iii. validating, by the remote computing device penetration testing software module, that the potential vulnerability can be used for successfully compromising the target network node, the validating achieved without compromising the target network node, the validating comprising:

1. receiving data from the reconnaissance agent software module installed on the target network node, the received data including internal data of the target network node;

2. based on the internal data of the target network node, evaluating whether the target network node could be successfully compromised using the potential vulnerability;

iv. if the validating determines that the potential vulnerability can be used to successfully compromise the target network node, determining, by the remote computing device penetration testing software module, a security vulnerability of the networked system;

b. reporting the security vulnerability of the networked system, the reporting comprising at least one of: (i) displaying information about the security vulnerability of the networked system to a user of the remote computing device; and (ii) transmitting the information about the security vulnerability of the networked system to another computing device.

The method may further be characterized by:

(i) the executing of the penetration test further comprising: validating, by the remote computing device penetration testing software module and prior to the selecting of the target network node, that a second network node of the multiple network nodes can be compromised, (ii) the validating that the potential vulnerability can be used for successfully compromising the target network node further comprising: receiving data from the reconnaissance agent software module installed on the second network node, and (iii) the evaluating whether the target network node could be successfully compromised using the potential vulnerability is further based on the data received from the second network node.

In other words, the validating that the potential vulnerability can be used for successfully compromising the target network node may also depend on data received from the reconnaissance agent software module that is installed on a second network node that was already validated to be compromisable prior to the time the validating of the compromisability of the target network node starts.

For example, if the target network node is located behind a firewall that blocks access from the outside world to a certain Internet port, and the potential vulnerability operates by sending a message into this certain port, then even if the potential vulnerability could in theory compromise the target network node, it cannot be directly used by an attacker located outside the networked system. However, if the second network node is already under the control of the attacker and is also behind the same firewall, then it is not blocked by that firewall when attempting to send a message to the certain port of the target node (but may still be blocked by another firewall). Therefore, it is not possible to evaluate whether the target network node could be successfully compromised using the potential vulnerability without knowing whether the second network node can send messages that will reach the certain node of the target network node. This essential information is obtained from the reconnaissance agent software module that is installed on the second network node.

The selecting of the target network node may be based on data received by the remote computing device penetration testing software module from one or more network nodes.

The receiving of the internal data may be prior to the selecting of the target network node. In other words, the internal data of the target network node that is used for evaluating whether or not the target network node could be successfully compromised using the potential vulnerability, may be obtained from reports of the reconnaissance agent software module installed on the target network node that were received during previous stages of the test. For example, the agent may have sent periodic reports to the remote computing device during a previous stage of the penetration tests, or the agent may have sent a report in response to a query from the remote computing device penetration testing software module sent during a previous stage of the penetration test.

Alternatively, the receiving of the internal data may be subsequent to the selecting of the target network node. In other words, the internal data of the target network node that is used for evaluating whether or not the target network node could be successfully compromised using the potential vulnerability, may be obtained from a report of the reconnaissance agent software module installed on the target network node that was generated and sent specifically for the current stage of the penetration test. For example, after selecting the target network node, the remote computing device penetration testing software module may send a query to the newly selected target node, asking for data that may be used for selecting the potential vulnerability.

The internal data of the target network node may include at least one of (i) an internal condition of the target network node, and (ii) internal factual data of the target network node. For example, the internal data may indicate that the memory of the target network node is over 95% used or the identity of the vendor of the communication controller of the target network node.

Definitions

This disclosure should be interpreted according to the definitions below.

In case of a contradiction between the definitions in this Definitions section and other sections of this disclosure, this section should prevail.

In case of a contradiction between the definitions in this section and a definition or a description in any other document, including in another document incorporated in this disclosure by reference, this section should prevail, even if the definition or the description in the other document is commonly accepted by a person of ordinary skill in the art.

1. "computing device"—Any device having a processing unit into which it is possible to install code that can be executed by the processing unit. The installation of the code may be possible even while the device is operative in the field or it may be possible only in the factory.
2. "peripheral device"—Any device, whether a computing device or not, that provides input or output services to at least one other device that is a computing device. Examples of peripheral devices are printers, plotters, scanners, environmental sensors, smart-home controllers, digital cameras, speakers and display screens. A peripheral device may be directly connected to a single computing device or may be connected to a communication system through which it can communicate with one or more computing devices. A storage device that is (i) not included in or directly connected to a single computing device, and (ii) accessible by multiple computing devices, is a peripheral device.
3. "network" or "computing network"—A collection of computing devices and peripheral devices which are all connected to common communication means that allow direct communication between any two of the devices without requiring passing the communicated data through a third device. The network includes both the connected devices and the communication means. A network may be wired or wireless or partially wired and partially wireless.
4. "networked system" or "networked computing system"—One or more networks that are interconnected so that communication is possible between any two devices of the one or more networks, even if they do not belong to the same network. The connection between different networks of the networked system may be achieved through dedicated computing devices, and/or through computing devices that belong to multiple networks of the networked system and also have other functionality in addition to connecting between networks. The networked system includes the one or more networks, any connecting computing devices and also peripheral devices accessible by any computing device of the networked system. Note that a single network is a networked system having only one network, and therefore a network is a special case of a networked system.
5. "module"—A portion of a system that implements a specific task. A module may be composed of hardware, software or any combination of both. For example, in a module composed of both hardware and software, the hardware may include a portion of a computing device, a single computing device or multiple computing devices, and the software may include software code executed by the portion of the computing device, by the single computing device or by the multiple computing devices. A computing device associated with a module may include one or more processors and computer readable storage medium (non-transitory, transitory or a combination of both) for storing instructions or for executing instructions by the one or more processors.
6. "network node of a networked system" or "node of a networked system"—Any computing device or peripheral device that belongs to the networked system.
7. "security vulnerability of a network node" or "vulnerability of a network node"—A weakness which allows an attacker to compromise the network node. A vulnerability of a network node may be caused by one or more of a flawed configuration of a component of the network node, a flawed setting of a software module in the network node, a bug in a software module in the network node, a human error while operating the network node, having trust in an already-compromised other network node, and the like.

A weakness that allows an attacker to compromise a network node only conditionally, depending on current conditions in the network node or in the networked system in which the network node resides, is still a vulnerability of the network node, but may also be referred to as a "potential vulnerability of the network node". For example, a vulnerability that compromises any network node running the Windows 7 Operating System, but only if the network node receives messages through a certain Internet port, can be said to be a vulnerability of any Windows 7 network node, and can also be said to be a potential vulnerability of any such node. Note that in this example the potential vulnerability may fail in compromising the node either because the certain port is not open (a condition in the node) or because a firewall is blocking messages from reaching the certain port in the node (a condition of the networked system).

8. "security vulnerability of a networked system" or "vulnerability of a networked system"—A weakness which allows an attacker to compromise the networked system. A vulnerability of a networked system may be caused by one or more of a vulnerability of a network node of the networked system, a flawed configuration of a component of the networked system, a flawed setting of a software module in the networked system, a bug in a software module in the networked system, a human error while operating the networked system, and the like. A weakness that allows an attacker to compromise a networked system only conditionally, depending on current conditions in the networked system, is still a vulnerability of the networked system, but may also be referred to as a "potential vulnerability of the networked system". For example, if a network node of the networked system has a potential vulnerability then that vulnerability can be said to be a vulnerability of the networked system, and can also be said to be a potential vulnerability of the networked system.

9. "validating a vulnerability" or "validating a potential vulnerability" (for a given network node or for a given networked system)—Verifying that the vulnerability compromises the given network node or the given networked system under the conditions currently existing in the given network node or the given networked system. The validation of the vulnerability may be achieved by actively attempting to compromise the given network node or the given networked system and then checking if the compromising attempt was successful. Such validation is referred to as "active validation".

Alternatively, the validation of the vulnerability may be achieved by simulating the exploitation of the vulnerability or by otherwise evaluating the results of such exploitation without actively attempting to compromise the given network node or the given networked system. Such validation is referred to as "passive validation".

10. "vulnerability management"—A cyclical practice of identifying, classifying, remediating, and mitigating vulnerabilities of network nodes in a networked system.

11. "penetration testing" or "pen testing" (in some references also known as "red team assessment" or "red team testing", but in other references those terms referring to a red team have a different meaning than "penetration testing")—A process in which a networked system is evaluated in order to determine if it can be compromised by an attacker by utilizing one or more security vulnerabilities of the networked system. If it is determined that the networked system can be compromised, then the one or more security vulnerabilities of the networked system are identified and reported. Unlike a vulnerability management process which operates at the level of isolated vulnerabilities of individual network nodes, a penetration test may operate at a higher level which considers vulnerabilities of multiple network nodes that might be jointly used by an attacker to compromise the networked system. A penetration testing process involves at least the following functions: (i) a reconnaissance function, (ii) an attack function, and (iii) a reporting function. It should be noted that the above functions do not necessarily operate sequentially according to the above order, but may operate in parallel or in an interleaved mode. Unless otherwise explicitly specified, a reference to penetration testing should be understood as referring to automated penetration testing.

12. "automated penetration testing"—Penetration testing in which at least one of the reconnaissance function, the attack function and the reporting function is at least partially automated.

13. "penetration testing system"—A system capable of performing penetration testing, regardless if composed of hardware, software or combination of both.

14. "reconnaissance function" or "recon function"—The function in a penetration testing process that handles collection of data about the tested networked system. The collected data may include internal data of one or more network nodes of the tested networked system. Additionally, the collected data may include data about communication means of the tested networked system and about peripheral devices of the tested networked system. The collected data may also include data that is only indirectly related to the tested networked system, for example business intelligence data about the organization owning the tested networked system, collected in order to use it for assessing importance of resources of the networked system. The functionality of a reconnaissance function may be implemented by any combination of (i) software executing in a remote computing device, where the remote computing device may probe the tested networked system for the purpose of collecting data about it, (ii) hardware and/or software simulating or duplicating the tested networked system, (iii) a reconnaissance agent software module executing in one or more network nodes of the tested networked system.

15. "attack function"—The function in a penetration testing process that handles determination of whether one or more security vulnerabilities exist in the tested networked system. The determination is based on data collected by the reconnaissance function of the penetration testing. The attack function generates data about each of the identified security vulnerabilities, if any.

The functionality of an attack function may be implemented by any combination of (i) software executing in a remote computing device, where the remote computing device may attack the tested networked system for the purpose of verifying that it can be compromised, (ii) hardware and/or software simulating or duplicating the tested networked system, (iii) an attack agent software module executing in one or more network nodes of the tested networked system. The methods used by an attack function may include executing a real attack on the tested networked system by attempting to change at least one setting, mode or state of a network node or of a hardware or software component of a network node, in order to verify that the tested networked system may be compromised. In such case, the attempt may result in actually compromising the tested networked system. Alternatively, the methods used by an attack function may be such that whenever there is a need to verify whether a setting, a mode or a state of a network node or of a hardware or software component of a network node can be changed in a way that compromises the tested networked system, the verification is done by simulating the effects of the change or by otherwise evaluating them without ever actually compromising the tested networked system.

16. "reporting function"—The function in a penetration testing process that handles reporting of results of the penetration testing. The reporting comprises at least one of (i) causing a display device to display a report including information about the results of the penetration testing, (ii) recording a report including information about the results of the penetration testing in a file, and (iii) electronically transmitting a report including information about the results of the penetration testing. The functionality of a reporting function may be implemented by software executing in a remote computing device, for example in the computing device implementing the attack function of the penetration testing.

17. "recovery function" or "clean-up function"—The function in a penetration testing process that handles cleaning-up after a penetration test. The recovery includes undoing any operation done during the penetration testing process that results in compromising the tested networked system.

The functionality of a recovery function may be implemented by any combination of (i) software executing in a remote computing device, for example in the computing device implementing the attack function of the penetration testing, (ii) an attack agent software module executing in one or more network nodes of the tested networked system.

18. "a campaign of penetration testing" or "penetration testing campaign"—A specific run of a specific test of a specific networked system by the penetration testing system.

19. "results of a penetration testing campaign"—Any output generated by the penetration testing campaign. This includes, among other things, data about any security vulnerability of the networked system tested by the penetration testing campaign that is detected by the campaign. It should be noted that in this context the word "results" is used in its plural form regardless of the amount of output data generated by the penetration testing campaign, including when the output consists of data about a single security vulnerability.

20. "information item of a campaign"—A variable data item that a penetration testing system must know its value before executing the campaign. Note that a data item must be able to have different values at different campaigns in order to be considered an information item of the campaign. If a data item always has the same value for all campaigns, it is not an information item of the campaign, even if it must be known and is being used by the penetration testing system when executing the campaign. An information item of a campaign is either a primary information item of the campaign or a secondary information item of the campaign.

A type of an attacker and a goal of an attacker are examples of information items of a campaign. Another example of an information item of a campaign that is more complex than the previous two simple examples is a subset of the network nodes of the networked system that is assumed to be already compromised at the time of beginning the penetration testing campaign, with the subset defined either by an explicit selection of network nodes or by a Boolean condition each node of the subset has to satisfy. A value of an information item may be composed either of a simple value or of both a main value and one or more auxiliary values. If a specific main value of an information item requires one or more auxiliary values that complete the full characterization of the value, then the combination of the main value and the one or more auxiliary values together is considered to be the value assigned to the information item. For example, for a "goal of the attacker" information item, after a user selects a main value of "exporting a specific file from whatever node having a copy of it", the user still has to provide a file name as an auxiliary value in order for the goal information item to be fully characterized. In this case the combination of "exporting a specific file from whatever node having a copy of it" and the specific file name is considered to be the value of the "goal of the attacker" information item.

21. "primary information item of a campaign"—An information item of the campaign which is completely independent of previously selected values of other information items of the campaign. In other words, the options available to a user for selecting the value of a primary information item of the campaign are not dependent on any value previously selected for any another information item of the campaign. For example, the options available to the user for selecting a goal of the attacker are independent of values previously selected for any other information item of the campaign, and therefore the goal of the attacker is a primary information item of the campaign.

22. "secondary information item of a campaign"—An information item of the campaign which depends on at least one previously selected value of another information item of the campaign. In other words, the options available to a user for selecting the value of a secondary information item of the campaign depend on at least one value previously selected for another information item of the campaign. For example, the options available to the user for selecting a capability of an attacker may depend on the previously selected value of the type of the attacker. For a first type of attacker the available capabilities to select from may be a first group of capabilities, while for a second type of attacker the available capabilities to select from may be a second group of capabilities, different from the first group. Therefore, a capability of the attacker is a secondary information item of the campaign.

23. "specifications of a campaign" or "scenario"—A collection of values assigned to all information items of the campaign. As having a value for each information item of a campaign is essential for running it, a campaign of a penetration testing system cannot be run without providing the penetration testing system with full specifications of the campaign. A value of an information item included in the specifications of a campaign may be manually selected by a user or may be automatically determined by the penetration testing system. In the latter case, the automatic determination by the system may depend on one or more values selected by the user for one or more information items of the campaign, or it may be independent of any selection by the user. For example, the selection of the capabilities of the attacker may automatically be determined by the system based on the user-selected type of the attacker, and the lateral movement strategy of the attacker may be automatically determined by the system independently of any user selection.

24. "pre-defined scenario", "pre-defined test scenario", "scenario template" or "template scenario"—A scenario that exists in storage accessible to a penetration testing system before the time a campaign is started, and can be selected by a user of the penetration testing system for defining a campaign of penetration testing. A pre-defined scenario may be created and provided by the provider of the penetration testing system and may be part of a library of multiple pre-defined scenarios. Alternatively, a pre-defined scenario may be created by the user of the penetration testing system using a scenario editor provided by the provider of the penetration testing system.

A penetration testing system may require that a campaign of penetration testing that is based on a pre-defined scenario must have all its values of information items taken from the pre-defined scenario, with no exceptions. Alternatively, a penetration testing system may allow a user to select a pre-defined scenario and then override and change one or more values of information items of a campaign that is based on the pre-defined scenario.

25. "attacker" or "threat actor"—An entity, whether a single person, a group of persons or an organization, that might conduct an attack against a networked system by penetrating it for uncovering its security vulnerabilities and/or for compromising it.

26. "a type of an attacker"—A classification of the attacker that indicates its main incentive in conducting attacks of networked systems. Typical values for a type of an attacker are state-sponsored, opportunistic cyber criminal, organized cyber criminal and insider. An attacker can have only a single type.

27. "a capability of an attacker"—A tool in the toolbox of the attacker. A capability describes a specific action that the attacker can perform. Examples of capabilities are copying a local file of a network node and exporting it to the attacker out of the networked system and remotely collecting database information from an SQL server of the networked system. In some systems, selecting a type of an attacker causes a corresponding default selection of capabilities for that type of attacker, but the user may have an option to override the default selection and add or delete capabilities. An attacker can have one or multiple capabilities.

28. "a goal of an attacker"—What the attacker of a campaign is trying to achieve when attacking a targeted networked system. In other words, what is the criterion according to which it will be judged whether the attack was a success or a failure and/or to what extent was it a success or a failure. Selecting a type of an attacker may cause a default selection of a goal for that attacker, but the user may have an option to override the default selection. An attacker can have one or multiple goals.

29. "a lateral movement strategy of an attacker"—A decision logic applied by the attacker of a campaign for selecting the next network node to try to compromise. During a penetration testing campaign, the attacker is assumed to make progress by an iterative process in which in each iteration he selects the next node to attack, based on the group of network nodes he already controls (i.e. that are already compromised). If the attack on the selected node is successful, that node is added to the group of nodes that are already compromised, and another iteration starts. If the attempt to compromise the selected node fails, another node is selected, either according to some other rule or randomly. It should be noted that all types of penetration testing systems, whether using simulated penetration testing, actual attack penetration testing or some other form of penetration testing, must use a lateral movement strategy. In the case of a penetration testing system that actually attacks the tested networked system, the lateral movement strategy selects the path of attack actually taken through the networked system. In the case of a penetration testing system that simulates or evaluates the results of attacking the tested networked system, the lateral movement strategy selects the path of attack taken in the simulation or the evaluation through the networked system. Therefore in the above explanation, the term "attack" should be understood to mean "actual attack or simulated attack", the term "already controls" should be understood to mean "already controls or already determined to be able to control", the term "already compromised" should be understood to mean "already compromised or already determined to be compromisable", etc. A simple example of a lateral movement strategy is a "depth first" strategy. In such strategy, the next network node to try to compromise is an immediate neighbor of the last network node that was compromised that is not yet compromised (provided such neighbor node exists). Two network nodes are "immediate neighbors" of each other if and only if they have a direct communication link between them that does not pass through any other network node. Another simple example is a "breadth search" strategy. In such strategy, the next network node to try to compromise is a network node whose distance from the first node compromised by the campaign is the smallest possible. The distance between two network nodes is the number of network nodes along the shortest path between them, plus one. A path is an ordered list of network nodes in which each pair of adjacent nodes in the list is a pair of immediate neighbors. Thus, the distance between two immediate neighbors is one. An example of a more advanced lateral movement strategy is a strategy that is applicable when a goal of the attacker is related to a resource of the networked system that resides in a specific network node. In such case the next network node to try to compromise may be selected by determining the shortest path in the networked system leading from an already compromised node to the specific node containing the desired resource, and picking the first node on this path to be the next node to try to compromise. Note that if the shortest path has a length of one (which happens when the specific node is an immediate neighbor of an already compromised node), then the next node to try to compromise is the specific node containing the desired resource. Another example of a lateral movement strategy is a strategy that gives priority to network nodes satisfying a specific condition, for example nodes that are known to have a specific weakness, such as running the Windows XP operating system. In such case the next node to try to compromise is a node that satisfies the condition and is also an immediate neighbor of an already compromised node (if such node exists). Selecting a type of an attacker may cause a default selection of a lateral movement strategy for that attacker, but the user may have an option to override the default selection. An attacker can only have a single lateral movement strategy.

30. "penetration testing by simulation" or "simulated penetration testing"—Penetration testing in which (i) the functionality of the reconnaissance function is fully implemented by software executing by a remote computing device and/or by hardware and/or software simulating or duplicating the tested networked system, where the remote computing device may probe the tested networked system for the purpose of collecting data about it, as long as this is done without risking compromising the tested networked system, and (ii) the methods used by the attack function are such that whenever there is a need to verify whether a setting, a mode or a state of a network node or of a hardware or software component of a network node can be changed in a way that compromises the tested networked system, the verification is done by simulating the effects of the change or by otherwise evaluating them without risking compromising the tested networked system.

31. "penetration testing by actual attack" or "actual attack penetration testing" or "penetration testing by actual exploit" or "actual exploit penetration testing"—Penetration testing in which (i) the functionality of the reconnaissance function is fully implemented by (A) software executing in a remote computing device, where the remote computing device may probe the tested networked system for the purpose of collecting data about it even if this risks compromising the tested networked system, and/or by (B) software executing in one or more network nodes of the tested networked system that analyzes network traffic and network packets of the tested networked system for collecting data about it, and (ii) the methods used by the attack function include executing a real attack on the tested networked system by attempting to change at least one setting, mode or state of a network node or of a hardware or software component of a network node in order to verify that the tested networked system may be compromised, such that the attempt may result in compromising the tested networked system.

32. "penetration testing by reconnaissance agents" or "reconnaissance agent penetration testing"—Penetration testing in which (i) the functionality of the reconnaissance function is at least partially implemented by a reconnaissance agent software module installed and executed in each one of multiple network nodes of the tested networked system, where the data collected by at least one instance of the reconnaissance agent software module includes internal data of the network node in which it is installed, and the data collected by at least one instance of the reconnaissance agent software module is at least partially collected during the penetration testing process, and (ii) the methods used by the attack function are such that whenever there is a need to verify whether a setting, a mode or a state of a network node or of a hardware or software component of a network node can be changed in a way that compromises the tested networked system, this is done by simulating the effects of the change or by otherwise evaluating them without risking compromising the tested networked system.

33. "reconnaissance client agent", "reconnaissance agent" or "recon agent"—A software module that can be installed on a network node and can be executed by a processor of that network node for partially or fully implementing the reconnaissance function of a penetration test. A reconnaissance agent must be capable, when executed by a processor of the network node in which it is installed, of collecting data at least about some of the events occurring in the network node. Such events may be internal events of the network node or messages sent out of the network node or received by the network node. A reconnaissance agent may be capable of collecting data about all types of internal events of its hosting network node. Additionally, it may be capable of collecting other types of data of its hosting network node. A reconnaissance agent may additionally be capable of collecting data about other network nodes or about other components of a networked system containing the hosting network node. A reconnaissance agent may be persistently installed on a network node, where "persistently" means that once installed on a network node the reconnaissance agent survives a reboot of the network node. Alternatively, a reconnaissance agent may be non-persistently installed on a network node, where "non-persistently" means that the reconnaissance agent does not survive a reboot of the network node and consequently should be installed again on the network node for a new penetration test in which the network node takes part, if the network node was rebooted since the previous penetration test in which it took part.

34. "attack client agent" or "attack agent"—A software module that can be installed on a network node and can be executed by a processor of that network node for partially or fully implementing the attack function of a penetration test. Typically, an attack agent is installed by an actual attack penetration testing system in a network node that it had succeeded to compromise during a penetration test. Once installed on such network node, the attack agent may be used as a tool for compromising other network nodes in the same networked system. In such case, the attack agent may include code that when executed by a processor of the compromised network node compromises another network node that is adjacent to it in the networked system, possibly taking advantage of the high level of trust it may have from the point of view of the adjacent network node. Another type of an attack agent may include code that when executed by a processor of a network node determines whether that network node would be compromised if a given operation is performed.

35. "penetration testing software module" or "remote computing device penetration testing software module"—A software module that implements the full functionality of a penetration testing system, except for the functionality implemented by (i) reconnaissance agents, (ii) attack agents, and (iii) hardware and/or software simulating or duplicating the tested networked system, if such components are used in the implementation of the penetration testing system. The penetration testing software module may be installed and executed on a single computing device or comprise multiple software components that reside on multiple computing devices. For example, a first component of the penetration testing software module may implement part or all of the reconnaissance function and be installed and executed on a first computing device, a second component of the penetration testing software module may implement part or all of the attack function and be installed and executed on a second computing device, and a third component of the penetration testing software module may implement the reporting function and be installed and executed on a third computing device.

36. "internal data of a network node"—Data related to the network node that is only directly accessible to code executing by a processor of the network node and is only accessible to any code executing outside of the network node by receiving it from code executing by a processor of the network node. Examples of internal data of a network node are data about internal events of the network node, data about internal conditions of the network node, and internal factual data of the network node.

37. "internal event of/in a network node"—An event occurring in the network node whose occurrence is only directly detectable by code executing by a processor of the network node. Examples of an internal event of a network node are an insertion of a USB drive into a port of the network node, and a removal of a USB drive from a port of the network node. An internal event may be a free event or a non-free event. It should be noted that the term "an event of X" refers to any occurrence of an event of the type X and not to a specific occurrence of it. For referring to a specific occurrence of an event of type X one should explicitly say "an occurrence of event of X". Thus, a software module which looks for detecting insertions of a USB drive into a port is "detecting an event of USB drive insertion", while after that module had detected such event it may report "an occurrence of an event of USB drive insertion".

38. "internal condition of/in a network node"—A Boolean condition related to the network node which can only be directly tested by code executing by a processor of the network node. Examples of an internal condition of a network node are whether the local disk of the terminal node is more than 98% full or not, and whether a USB drive is currently inserted in a port of the network node.

39. "internal factual data of/in a network node" or "internal facts of a network node"—Facts related to the network node which can only be directly found by code executing by a processor of the network node. Examples of factual data of a network node are the version of the firmware of a solid-state drive installed in the network node, the hardware version of a processor of the network node, and the amount of free space in a local disk of the network node.

40. "resource of a networked system"—A file in a network node of the networked system, a folder in a network node of the networked system, credentials of a user of the networked system, a peripheral device of a network node of the networked system, or a peripheral device directly attached to a network of the networked system.

41. "compromising a network node"—Successfully causing execution of an operation in the network node that is not allowed for the entity requesting the operation by the rules defined by an administrator of the network node, or successfully causing execution of code in a software module of the network node that was not predicted by the vendor of the software module. Examples for compromising a network node are reading a file without having read permission for it, modifying a file without having write permission for it, deleting a file without having delete permission for it, exporting a file out of the network node without having permission to do so, getting an access right higher than the one originally assigned without having permission to get it, getting a priority higher than the one originally assigned without having permission to get it, changing a configuration of a firewall network node such that it allows access to other network nodes that were previously hidden behind the firewall without having permission to do it, and causing execution of software code by utilizing a buffer overflow. As shown by the firewall example, the effects of compromising a certain network node are not necessarily limited to that certain network node. In addition, executing successful ARP spoofing, denial-of-service, man-in-the-middle or session-hijacking attacks against a network node are also considered compromising that network node, even if not satisfying any of the conditions listed above in this definition.

42. "ARP spoofing"—a technique for compromising a target network node in which an attacker sends a false Address Resolution Protocol (ARP) reply message to the target network node. The aim is to associate an attacker's MAC address (either a MAC address of the node sending the false ARP reply message or a MAC address of another node controlled by the attacker) with the IP address of another host, such as the default gateway, causing any traffic sent by the target node and meant for that IP address to be sent to the attacker instead. ARP spoofing may allow an attacker to intercept data frames on a network, modify the traffic, or stop all traffic to a certain node. Often the attack is used as an opening for other attacks, such as denial-of-service, man-in-the-middle, or session-hijacking attacks.

43. "denial-of-service attack"—a cyber-attack where an attacker seeks to make a service provided by a network node to other network nodes unavailable to its intended users either temporarily or indefinitely. The denial-of-service attack may be accomplished by flooding the node providing the targeted service with superfluous requests in an attempt to overload it and prevent some or all legitimate requests from being fulfilled. Alternatively, the denial-of-service attack may be accomplished by causing some or all of the legitimate requests addressed to the targeted service to not reach their destination.

44. "man-in-the-middle attack"—a cyber-attack where an attacker secretly relays and possibly alters the communication between two network nodes who believe they are directly communicating with each other. One example of man-in-the-middle attacks is active eavesdropping, in which the attacker makes independent connections with the victims and relays messages between them to make them believe they are communicating directly with each other, when in fact the entire communication session is controlled by the attacker.

The attacker must be able to intercept all relevant messages passing between the two victims and inject new ones.
45. "session-hijacking attack"—a cyber-attack where a valid communication session between two network nodes in a networked system is used by an attacker to gain unauthorized access to information or services in the networked computer system.
46. "compromising a networked system"—Compromising at least one network node of the networked system or successfully causing execution of an operation in the networked system that is not allowed for the entity requesting the operation by the rules defined by an administrator of the networked system. Examples for operations in the networked system that may not be allowed are exporting a file out of the networked system without having permission to do so, sending a file to a network printer without having permission to do so, and copying a file from one network node to another network node without having permission to do so.
47. "compromising a software application"—Successfully causing the software application to execute an operation that is not allowed for the entity requesting the operation by the rules defined by an administrator of the network node on which the software application is installed or by a vendor of the software application, or successfully causing the execution of code in the software application that was not predicted by the vendor of the software application. Examples for compromising a software application are changing a configuration file controlling the operation of the software application without having permission for doing so, and activating a privileged function of the software application without having permission for doing so. In addition, causing the software application to execute a macro without checking rights of the macro code to do what it is attempting to do is also considered compromising that software application, even if not satisfying any of the conditions listed above in this definition.
48. "administrator of a network node"—Any person that is authorized, among other things, to define or change at least one rule controlling at least one of an access right, a permission, a priority and a configuration in the network node.
49. "administrator of a networked system"—Any person that is authorized, among other things, to define or change at least one rule controlling at least one of an access right, a permission, a priority and a configuration in the networked system. Note that an administrator of a networked system may also be an administrator of one or more of the network nodes of the networked system.
50. "remote computing device" or "penetration testing remote computing device" (with respect to a given networked system)—A computing device that executes software implementing part or all of the penetration testing software module that is used for testing the given networked system.
A remote computing device may be (i) outside of the given networked system, or (ii) inside the given networked system. In other words, a remote computing device is not necessarily physically remote from the given networked system. It is called "remote" to indicate its functionality is logically separate from the functionality of the given networked system. A remote computing device may (i) be a dedicated computing device that is dedicated only to doing penetration testing, or (ii) also implement other functionality not directly related to penetration testing. A remote computing device is not limited to be a single physical device with a single processing unit. It may be implemented by multiple separate physical devices packaged in separate packages that may be located at different locations. Each of the separate physical devices may include one or multiple processing units. A remote computing device may be (i) a physical computing device, or (ii) a virtual machine running inside a physical computing device on top of a hosting operating system.
51. "explicitly selecting"—Directly and clearly selecting, by a human user, of one option out of multiple options available to the human user, leaving no room for doubt and not relying on making deductions by a computing device. Examples of explicit selections are (i) selection of a specific type of an attacker from a drop-down list of types, (ii) selection of specific one or more attacker capabilities by marking one or more check boxes in a group of multiple check boxes corresponding to multiple attacker capabilities, and (iii) reception for viewing by a user of a recommendation automatically computed by a computing device for a value of an information item and actively approving by the user of the recommendation for using the value, provided that the approving user has an option of rejecting the recommendation and selecting a different value for the information item. Examples of selections that are not explicit selections are (i) selection of specific one or more attacker capabilities by selecting a specific scenario of a penetration testing system from a pre-defined library of scenarios, where the specific scenario includes an attacker having the one or more capabilities, and (ii) selection of specific one or more attacker capabilities by selecting a specific goal of an attacker, accompanied by a deduction by a computing device concluding that the specific one or more attacker capabilities must be selected because they are essential for the attacker to succeed in meeting the specific goal.
52. "automatically selecting"—Selecting, by a computing device, of one option out of multiple options, without receiving from a human user an explicit selection of the selected option. It should be noted that the selecting of an option is an automatic selecting even if the computing device is basing the selection on one or more explicit selections by the user, as long as the selected option itself is not explicitly selected by the user. It should also be noted that receiving from a user of an approval for a recommendation which is otherwise automatically selected without giving the user an ability to override the recommendation does not make the selection a non-automatic selection.
An example of an automatic selection is a selection by a computing device of one or more attacker capabilities by (a) receiving from a user an explicit selection of a specific scenario of a penetration testing system from a pre-defined library of scenarios, (b) determining by the computing device that the specific scenario includes an attacker having the one or more capabilities, and (c) deducing by the computing device that the user wants to select the one or more attacker capabilities.
An example of a selection that is not an automatic selection is a selection of a value for an information item by (a) calculating by a computing device of a recommended value for the information item, (b) displaying the recommendation to a user, and (c) receiving from the user an explicit approval to use the recommended value of the information item, provided that the approving user has an option of rejecting the recommendation and selecting a different value for the information item.

53. "user interface"—A man-machine interface that does at least one of (i) providing information to a user, and (ii) receiving input from the user. Towards this end, any user interface includes at least one of (i) an input device (e.g. touch-screen, mouse, keyboard, joystick, camera) for receiving input from the user, and (ii) an output device (e.g. display screen such as a touch-screen, speaker) for providing information to the user. A user interface typically also includes executable user-interface code for at least one of (i) causing the output device to provide information to the user (e.g. to display text associated with radio-buttons or with a check list, or text of a drop-down list) and (ii) processing user-input received via the input device. In different examples, the executable code may be compiled-code (e.g. in assembly or machine-language), interpreted byte-code (e.g. Java byte-code), or browser-executed code (e.g. JavaScript code) that may be sent to a client device from a remote server and then executed by the client device.

54. "user interface of a computing device"—A user interface that is functionally attached to the computing device and serves the computing device for interacting with the user. An input device of a user interface of a computing device may share a common housing with the computing device (e.g. a touch-screen of a tablet), or may be physically separate from the computing device and be in communication with it, either through a physical port (e.g. a USB port) or wirelessly (e.g. a wireless mouse). An output device of a user interface of a computing device may share a common housing with the computing device (e.g. a touch-screen of a tablet), or may be physically separate from the computing device and be in communication with it, either through a physical port (e.g. an HDMI port) or wirelessly. User-interface code of a user interface of a computing device is stored in a memory accessible to the computing device and is executed by one or more processors of the computing device. In one example related to web-based user interfaces, at least some of this code may be received from a remote server and then locally executed by the computing device which functions as a client. In another example related to locally-implemented user interfaces, all of the user-interface code is pre-loaded onto the computing device.

55. "subset/subgroup of a given set/group" or "sub-set/sub-group of a given set/group"—A set/group that satisfies the condition that that every member of it is also a member of the given set/group. Unless otherwise stated, a subset/subgroup may be empty and contain no members at all. Unless otherwise stated, a subset/subgroup of a given set/group may contain all the members of the given set/group and be equal to the given set/group.

56. "proper subset/subgroup of a given set/group" or "proper sub-set/sub-group of a given set/group"—A subset/subgroup of the given set/group that is not equal to the given set/group. In other words, there is at least one member of the given set/group that is not a member of the subset/subgroup.

57. "or"—A logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.

CONCLUDING COMMENT

All references cited herein are incorporated by reference in their entirety. Citation of a reference does not constitute an admission that the reference is prior art.

It is further noted that any of the embodiments described above may further include receiving, sending or storing instructions and/or data that implement the operations described above in conjunction with the figures upon a computer readable medium. Generally speaking, a computer readable medium (e.g. non-transitory medium) may include storage media or memory media such as magnetic or flash or optical media, e.g. disk or CD-ROM, volatile or non-volatile media such as RAM, ROM, etc.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed is:

1. A method of carrying out a penetration testing campaign of a networked system by a penetration testing system, the penetration testing system comprising (A) a penetration testing software module installed on a remote computing device and (B) a reconnaissance agent software module (RASM) installed on at least some network nodes of the networked system, the method comprising:
   a. subsequent to installing the RASM on the at least some network nodes, initiating the penetration testing campaign;
   b. subsequent to the initiating of the penetration testing campaign, selecting a target network node of the networked system on which the RASM is installed;
   c. based on the target network node, selecting a potential vulnerability that may compromise the target network node;
   d. subsequent to the selecting of the potential vulnerability, receiving at the remote computing device and from the RASM installed on the target network node, internal data of the target network node;
   e. validating that the target network node could be successfully compromised using the selected potential vulnerability, the validating being carried out in a manner which does not expose the target network node to a risk of being compromised and which is based on the received internal data of the target network node;
   f. based on the potential vulnerability, determining a method for an attacker to compromise the target network node;

g. based on the method for an attacker to compromise the target network node, determining a security vulnerability of the networked system; and
h. reporting the security vulnerability of the networked system, the reporting comprising at least one of (i) causing a display device to display a report including information about the determined security vulnerability of the networked system, (ii) recording the report including the information about the determined security vulnerability of the networked system in a file, and (iii) electronically transmitting the report including the information about the determined security vulnerability of the networked system,
wherein each of steps a-h is performed by executing computer code of the penetration testing software module by one or more processors of the remote computing device.

2. The method of claim 1 wherein the internal data includes data about an internal event of the target network node.

3. The method of claim 1 wherein the internal data includes data about an internal condition of the target network node.

4. The method of claim 1 wherein the internal data includes data about an internal fact of the target network node.

5. The method of claim 1 wherein the selecting of the potential vulnerability is based on one or more properties of the target node.

6. The method of claim 1 wherein:
   i. the method further comprises performing the following steps, subsequent to steps b-f and before step g:
      A. selecting an additional target network node of the networked system on which the RASM is installed;
      B. based on the additional target network node, selecting an additional potential vulnerability that may compromise the additional target network node;
      C. subsequent to the selecting of the additional potential vulnerability, receiving at the remote computing device and from the RASM installed on the additional target network node, internal data of the additional target network node;
      D. validating that the additional target network node could be successfully compromised using the additional potential vulnerability, the validating being carried out in a manner which does not expose the additional target network node to a risk of being compromised and which is based on the received internal data of the additional target network node; and
      E. based on the additional potential vulnerability, determining a method for an attacker to compromise the additional target network node; and
   ii. the determining of the security vulnerability of the networked system is further based on the method for an attacker to compromise the additional target network node.

7. The method of claim 1, wherein the information about the determined security vulnerability of the networked system comprises at least one of: (i) information about a method for compromising the target network node (ii) information about one or more network nodes of the networked system which are vulnerable to attack, (iii) information about one or more resources of the networked system that could be damaged or exported out of the networked system by an attacker, and (iv) information about an ordered list of network nodes of the networked system, wherein an attacker could use a specific network node in said ordered list that is already compromised as a basis for compromising another network node that immediately follows said specific network node in said ordered list.

8. The method of claim 1, wherein the receiving of the internal data of the target network node is in response to sending by the remote computing device a message to the target network node, the message requesting specific internal data according to the selected potential vulnerability.

9. A method of carrying out a penetration testing campaign of a networked system by a penetration testing system, the penetration testing system comprising (A) a penetration testing software module installed on a remote computing device and (B) a reconnaissance agent software module (RASM) installed on at least some network nodes of the networked system, the method comprising:
   a. subsequent to installing the RASM on the at least some network nodes, initiating the penetration testing campaign;
   b. subsequent to the initiating of the penetration testing campaign, selecting a target network node of the networked system on which the RASM is installed;
   c. based on the target network node, selecting a potential vulnerability that may compromise the target network node;
   d. receiving at the remote computing device and from the RASM installed on the target network node, internal data of the target network node;
   e. validating that the target network node could be successfully compromised using the selected potential vulnerability, the validating being carried out in a manner which does not expose the target network node to a risk of being compromised and which is based on the received internal data of the target network node;
   f. based on the potential vulnerability, determining a method for an attacker to compromise the target network node;
   g. based on the method for an attacker to compromise the target network node, determining a security vulnerability of the networked system; and
   h. reporting the security vulnerability of the networked system, the reporting comprising at least one of (i) causing a display device to display a report including information about the determined security vulnerability of the networked system, (ii) recording the report including the information about the determined security vulnerability of the networked system in a file, and (iii) electronically transmitting the report including the information about the determined security vulnerability of the networked system,
   wherein each of steps a-h is performed by executing computer code of the penetration testing software module by one or more processors of the remote computing device.

10. The method of claim 9 wherein the internal data includes data about an internal event of the target network node.

11. The method of claim 9 wherein the internal data includes data about an internal condition of the target network node.

12. The method of claim 9 wherein the internal data includes data about an internal fact of the target network node.

13. The method of claim 9 wherein the selecting of the potential vulnerability is based on one or more properties of the target node.

14. The method of claim 9 wherein:
i. the method further comprises performing the following steps, subsequent to steps b-f and before step g:
   A. selecting an additional target network node of the networked system on which the RASM is installed;
   B. based on the additional target network node, selecting an additional potential vulnerability that may compromise the additional target network node;
   C. receiving at the remote computing device and from the RASM installed on the additional target network node, internal data of the additional target network node;
   D. validating that the additional target network node could be successfully compromised using the additional potential vulnerability, the validating being carried out in a manner which does not expose the additional target network node to a risk of being compromised and which is based on the received internal data of the additional target network node; and
   E. based on the additional potential vulnerability, determining a method for an attacker to compromise the additional target network node; and
ii. the determining of the security vulnerability of the networked system is further based on the method for an attacker to compromise the additional target network node.

15. The method of claim 9, wherein the information about the determined security vulnerability of the networked system comprises at least one of: (i) information about a method for compromising the target network node (ii) information about one or more network nodes of the networked system which are vulnerable to attack, (iii) information about one or more resources of the networked system that could be damaged or exported out of the networked system by an attacker, and (iv) information about an ordered list of network nodes of the networked system, wherein an attacker could use a specific network node in said ordered list that is already compromised as a basis for compromising another network node that immediately follows said specific network node in said ordered list.

16. The method of claim 9, wherein the receiving of the internal data of the target network node is in response to sending by the remote computing device a message to the target network node, the message requesting specific internal data according to the selected potential vulnerability.

17. A penetration testing system for carrying out a penetration testing campaign of a networked system in cooperation with a reconnaissance agent software module (RASM) installed on at least some network nodes of the networked system, the penetration testing system comprising:
   A. a remote computing device comprising a computer memory and one or more processors, the remote computing device in electronic communication with the networked system; and
   B. a non-transitory computer-readable storage medium containing first, second, third, fourth, fifth, sixth, seventh and eighth program instructions of a penetration testing software module, wherein:
      a. execution of the first program instructions, by the one or more processors of the remote computing device and subsequent to installing the RASM on the at least some network nodes, initiates the penetration testing campaign;
      b. execution of the second program instructions, by the one or more processors of the remote computing device and subsequent to the initiating of the penetration testing campaign, selects a target network node of the networked system on which the RASM is installed;
      c. execution of the third program instructions, by the one or more processors of the remote computing device, selects, based on the target network node, a potential vulnerability that may compromise the target network node;
      d. execution of the fourth program instructions, by the one or more processors of the remote computing device and subsequent to the selecting of the potential vulnerability, receives at the remote computing device and from the RASM installed on the target network node, internal data of the target network node;
      e. execution of the fifth program instructions, by the one or more processors of the remote computing device, validates that the target network node could be successfully compromised using the selected potential vulnerability such that the validating is carried out in a manner which does not expose the target network node to a risk of being compromised and which is based on the received internal data of the target network node;
      f. execution of the sixth program instructions, by the one or more processors of the remote computing device, determines, based on the potential vulnerability, a method for an attacker to compromise the target network node;
      g. execution of the seventh program instructions, by the one or more processors of the remote computing device, determines, based on the method for an attacker to compromise the target network node, a security vulnerability of the networked system; and
      h. execution of the eighth program instructions, by the one or more processors of the remote computing device, reports the security vulnerability of the networked system, the reporting comprising at least one of (i) causing a display device to display a report including information about the determined security vulnerability of the networked system, (ii) recording the report including the information about the determined security vulnerability of the networked system in a file, and (iii) electronically transmitting the report including the information about the determined security vulnerability of the networked system.

18. A penetration testing system for carrying out a penetration testing campaign of a networked system in cooperation with a reconnaissance agent software module (RASM) installed on at least some network nodes of the networked system, the penetration testing system comprising:
   A. a remote computing device comprising a computer memory and one or more processors, the remote computing device in electronic communication with the networked system; and
   B. a non-transitory computer-readable storage medium containing first, second, third, fourth, fifth, sixth, seventh and eighth program instructions of a penetration testing software module, wherein:
      a. execution of the first program instructions, by the one or more processors of the remote computing device and subsequent to installing the RASM on the at least some network nodes, initiates the penetration testing campaign;

b. execution of the second program instructions, by the one or more processors of the remote computing device and subsequent to the initiating of the penetration testing campaign, selects a target network node of the networked system on which the RASM is installed;

c. execution of the third program instructions, by the one or more processors of the remote computing device, selects, based on the target network node, a potential vulnerability that may compromise the target network node;

d. execution of the fourth program instructions, by the one or more processors of the remote computing device, receives at the remote computing device and from the RASM installed on the target network node, internal data of the target network node;

e. execution of the fifth program instructions, by the one or more processors of the remote computing device, validates that the target network node could be successfully compromised using the selected potential vulnerability such that the validating is carried out in a manner which does not expose the target network node to a risk of being compromised and which is based on the received internal data of the target network node;

f. execution of the sixth program instructions, by the one or more processors of the remote computing device, determines, based on the potential vulnerability, a method for an attacker to compromise the target network node;

g. execution of the seventh program instructions, by the one or more processors of the remote computing device, determines, based on the method for an attacker to compromise the target network node, a security vulnerability of the networked system; and h. execution of the eighth program instructions, by the one or more processors of the remote computing device, reports the security vulnerability of the networked system, the reporting comprising at least one of (i) causing a display device to display a report including information about the determined security vulnerability of the networked system, (ii) recording the report including the information about the determined security vulnerability of the networked system in a file, and (iii) electronically transmitting the report including the information about the determined security vulnerability of the networked system.

* * * * *